United States Patent
Yaung

(10) Patent No.: US 7,228,547 B2
(45) Date of Patent: Jun. 5, 2007

(54) METHOD, SYSTEM, AND PROGRAM FOR ENABLING ACCESS TO A PLURALITY OF SERVICES

(75) Inventor: Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 09/918,185

(22) Filed: Jul. 30, 2001

(65) Prior Publication Data

US 2003/0023662 A1    Jan. 30, 2003

(51) Int. Cl.
G06F 9/46 (2006.01)

(52) U.S. Cl. .................. 718/106; 718/100; 718/101; 719/316; 719/330; 709/210; 705/1

(58) Field of Classification Search ........ 718/100–108; 709/200, 202, 226, 223, 227–339, 210; 719/316, 719/330; 705/7, 1
See application file for complete search history.

(56) References Cited

U.S. PATENT DOCUMENTS

| | | | |
|---|---|---|---|
| 5,301,320 A | 4/1994 | McAtee et al. | |
| 5,535,322 A | 7/1996 | Hecht | |
| 5,572,673 A | 11/1996 | Shurts | |
| 5,596,744 A | 1/1997 | Dao et al. | |
| 5,596,750 A | 1/1997 | Li et al. | |
| 5,630,069 A * | 5/1997 | Flores et al. ................ | 705/7 |
| 5,634,053 A | 5/1997 | Noble et al. | |
| 5,634,127 A | 5/1997 | Cloud et al. | |
| 5,644,768 A | 7/1997 | Periwal et al. | |
| 5,721,912 A | 2/1998 | Stepczyk et al. | |
| 5,721,913 A | 2/1998 | Ackroff et al. | |
| 5,734,837 A | 3/1998 | Flores et al. | |
| 5,745,683 A | 4/1998 | Lee et al. | |

(Continued)

FOREIGN PATENT DOCUMENTS

JP          10-081425         3/1998

(Continued)

OTHER PUBLICATIONS

Schuster et al., "A general framework for the execution of heterogenous programs in workflow managemetn systems", IEEE 1996.*

(Continued)

*Primary Examiner*—Meng-Al T. An
*Assistant Examiner*—Lilian Vo
(74) *Attorney, Agent, or Firm*—David W. Victor; Konrad Raynes & Victor LLP

(57) ABSTRACT

Provided is a method, system, and program for enabling access to a plurality of services. A plurality of service class implementations is provided for services from different vendors, wherein each service class implementation provides an implementation of methods and objects from a same abstract service class. A service object is constructed for one service in response to at least one called method from one of the service class implementations. The service object includes information on resources of the service. Method calls are received from one service class implementation requesting information on service resources for one named service. The requested information is accessed from the service object for the named service to return to the method call.

45 Claims, 11 Drawing Sheets

U.S. PATENT DOCUMENTS

| | | |
|---|---|---|
| 5,745,687 A | 4/1998 | Randell |
| 5,752,027 A | 5/1998 | Familiar |
| 5,774,661 A | 6/1998 | Chatterjee et al. |
| 5,790,789 A | 8/1998 | Suarez |
| 5,794,250 A | 8/1998 | Cariño, Jr. et al. |
| 5,826,086 A | 10/1998 | Arima et al. |
| 5,826,239 A | 10/1998 | Du et al. |
| 5,860,066 A | 1/1999 | Rouse |
| 5,864,843 A | 1/1999 | Cariño, Jr. et al. |
| 5,873,083 A | 2/1999 | Jones et al. |
| 5,892,905 A | 4/1999 | Brandt et al. |
| 5,913,214 A | 6/1999 | Madnick et al. |
| 5,926,636 A | 7/1999 | Lam et al. |
| 5,930,512 A | 7/1999 | Boden et al. |
| 5,937,388 A | 8/1999 | Davis et al. |
| 5,951,649 A * | 9/1999 | Dobbins et al. ............ 709/238 |
| 5,960,420 A | 9/1999 | Leymann et al. |
| 5,987,422 A | 11/1999 | Buzsaki |
| 5,991,733 A | 11/1999 | Aleia et al. |
| 6,006,193 A * | 12/1999 | Gibson et al. ................. 705/8 |
| 6,012,067 A | 1/2000 | Sarkar |
| 6,044,378 A | 3/2000 | Gladney |
| 6,061,667 A * | 5/2000 | Danford-Klein et al. .... 705/400 |
| 6,065,009 A | 5/2000 | Leymann et al. |
| 6,073,109 A | 6/2000 | Flores et al. |
| 6,073,111 A | 6/2000 | Leymann et al. |
| 6,088,729 A * | 7/2000 | McCrory et al. ........... 709/227 |
| 6,115,646 A | 9/2000 | Fiszman et al. |
| 6,151,583 A | 11/2000 | Ohmura et al. |
| 6,170,002 B1 | 1/2001 | Ouchi |
| 6,226,641 B1 | 5/2001 | Hickson et al. |
| 6,278,977 B1 | 8/2001 | Agrawal et al. |
| 6,308,163 B1 | 10/2001 | Du et al. |
| 6,338,074 B1 | 1/2002 | Poindexter et al. |
| 6,345,296 B1* | 2/2002 | McCrory et al. ........... 709/228 |
| 6,349,238 B1 | 2/2002 | Gabbita et al. |
| 6,430,538 B1 | 8/2002 | Bacon et al. |
| 6,453,320 B1 | 9/2002 | Kukura et al. |
| 6,487,607 B1* | 11/2002 | Wollrath et al. ............ 719/330 |
| 6,539,396 B1 | 3/2003 | Bowman-Amuah |
| 6,578,006 B1 | 6/2003 | Saito et al. |
| 6,606,740 B1 | 8/2003 | Lynn et al. |
| 6,665,674 B1* | 12/2003 | Buchanan et al. ............ 707/10 |
| 6,665,814 B2 | 12/2003 | Hobson et al. |
| 6,681,243 B1* | 1/2004 | Putzolu et al. .............. 709/202 |
| 6,687,677 B1 | 2/2004 | Barnard et al. |
| 6,691,299 B1* | 2/2004 | Hart et al. .................. 717/108 |
| 6,721,713 B1 | 4/2004 | Guheen et al. |
| 6,769,113 B1 | 7/2004 | Bloom et al. |
| 6,769,124 B1* | 7/2004 | Schoening et al. ......... 719/316 |
| 6,816,902 B1 | 11/2004 | Bandat et al. |
| 6,823,513 B1 | 11/2004 | McNally et al. |
| 6,832,201 B1 | 12/2004 | Leymann et al. |
| 6,853,974 B1 | 2/2005 | Akifuji et al. |
| 6,877,153 B2 | 4/2005 | Konnersman |
| 6,937,993 B1 | 8/2005 | Gabbita et al. |
| 6,941,514 B2 | 9/2005 | Bradford |
| 2002/0022485 A1 | 2/2002 | Kolsky et al. |
| 2002/0032783 A1* | 3/2002 | Tuatini ....................... 709/229 |
| 2002/0038357 A1 | 3/2002 | Haverstock et al. |
| 2002/0040312 A1 | 4/2002 | Dhar et al. |
| 2002/0059411 A1* | 5/2002 | Barnhouse et al. ......... 709/223 |
| 2002/0103811 A1* | 8/2002 | Fankhauser et al. ..... 707/104.1 |
| 2002/0120685 A1* | 8/2002 | Srivastava et al. .......... 709/203 |
| 2002/0143949 A1* | 10/2002 | Rajarajan et al. ........... 709/226 |
| 2003/0023728 A1 | 1/2003 | Yaung |
| 2003/0033415 A1* | 2/2003 | Graylin et al. .............. 709/229 |
| 2003/0131075 A1* | 7/2003 | Bear et al. .................. 709/219 |
| 2004/0015821 A1 | 1/2004 | Lu et al. |

FOREIGN PATENT DOCUMENTS

| | | |
|---|---|---|
| JP | 10-326314 | 12/1998 |
| JP | 11-003298 | 1/1999 |
| JP | 11-175644 | 7/1999 |
| JP | 11-249983 | 9/1999 |
| WO | 0014618 | 3/2000 |

OTHER PUBLICATIONS

Schuster et al., "A client/server architecture for distributed workflow management systems", IEEE 1994.*

U.S. Appl. No. 09/894,074, filed on Jun. 28, 2001, entitled, "Method, System, and Program for Generating a Workflow", invented by WF Miller and AT Yaung.

U.S. Appl. No. 09/894,413, filed on Jun. 28, 2001, entitled, "Method, System, and Program for Using Objects in Data Stores During Execution of a Workflow", invented by JJ Lin; WF Miller; and AT Yaung.

U.S. Appl. No. 09/918,204, filed on Jul. 30, 2001, entitled, "Method, System, and Program for Transferring Data From an Application Engine", invented by T. Lee and AT Yaung.

U.S. Appl. No. 09/918,144, filed on Jul. 30, 2001, entitled, "Method, System, and Program for Maintaining Information in Database Tables and Performing Operations on Data in the Database Tables", invented by T. Lee; JJ Lin; and AT Yaung.

U.S. Appl. No. 09/918,143, filed on Jul. 30, 2001, entitled, "Method, System, and Program Workflow Related Operations", invented by T. Lee; JJ Lin; and AT Yaung.

U.S. Appl. No. 09/894,076, filed on Jun. 28, 2001, entitled, "Method, System, and Program for Executing a Workflow", invented by AT Yaung.

Galtzur, Z. et al. "Managing Workflow Using Database Techniques", IBM Technical Disclosure Bulletin, vol. 39, No. 08, Aug. 1996, pp. 199-201.

Yong, Y.M. "Template-Driven Document-Exchange Specification", IBM Technical Disclosure Bulletin, vol. 39, No. 11, Nov. 1996, pp. 173-178.

Duscher, R. et al. "Audit Trail Support For Program Activity Implementations of Workflow Management Systems", 1994, pp. 1-4.

Dr. Leymann, F. et al. "Context Support For Program Activity Implementations of Workflow Management Systems", 1994, pp. 1-4.

Sluiman, H. "A Relational Schema to Support Task and Workflow, Data Collection and Analysis", pp. 1-3.

IBM Corp. "Chapter 4. Introducing Enterprise Information Portal Workflow" from *Managing Enterprise Information Portal*, IBM Enterprise Information Portal for Multiplatforms, Version 7.1, #SC27-0875-00, Product No. 5697-G29 and 5697-G31, Aug. 2000, pp. iii.iv and pp. 39-45.

IBM, Corp. "Concepts and Architecture" IBM MQSeries Workflow, Version 3.3, #GH12-6285-03, Product No. 5697-FM3, Mar. 2001, pp. iii-58.

IBM, Corp. "User's Guide for the Work Management Builder" IBM ImagePlus Workfolder Application Facility for AS/400, Version 4 Release 1, #SC34-4587-00, Program No. 5733-A18, Sep. 1997, pp. iii-119.

Su, SYW et al. "An Extensible Knowledge Base Management System for Supporting Rule-based interoperability among Heterogeneous Systems" 1995, ACM # 0-89791-812-6/95/11, pp. 1-10.

Johansson, SE et al. "Expert Workflow, Building Knowledge-Based Workflow Systems with Object Technology", 1997, pp. 45-49.

Leymann, F. et al. "Workflow-based Applications" [online], vol. 36, No. 1—Application Development, pp. 1-22, plus 9 pages of linked Figures (drawings), and 2 pages of "Cited References and Notes". [Retrieved on May 17, 2001]. Retrieved from the Internet at <URL:.research.ibm.com/journal/sj/361/leymann.html>.

Vossen, G. "The WASA2 Object-Oriented Workflow Management System", 1999, ACM # 1-58113-084-8/99/05, pp. 587-589.

Choudhury, G.S., C. Requardt, I. Fujinaga, T. Dilauro, E.W. Brown, J.W. Warner, and B. Harrington, "Digital Workflow Management: The Lester S. Levy Digitized Collection of Sheet Music", [online], © 2000 //*First Monday*, [Retrieved on Mar. 17, 2005], retrieved from the Internet at <URL: firstmonday.org/issues/issue5_6/choudhury/index.html>.

Gulcu, C. (Ed.), "Suitable Interface Adaptor (Workflow Module)", *Cross-Organisational Workflow: Crossflow*, ESPRIT E/28635, Dec. 1999, pp. 1-12.

Hudgins, J. and L.A. Macklin, "New Materials, New Processes: Implementing Digital Imaging Projects into Existing Workflow", *Library Collections, Acquisitions, & Technical Services*, 2000, No. 24, pp. 189-204.

IBM Corporation, "Method for Testing Program Activity Implementations of Workflow Management Systems", *IBM Research Disclosure*, No. 408186, Apr. 1998, pp. 503-505.

IBM Corporation, "Non-Destructive Annotation of Documents in an Image Processing Environment", *IBM Research Disclosure*, No. 430191, Feb. 2000, pp. 404-408.

IBM Corporation, "Runtime Transaction Management in a Transaction Service", *IBM Research Disclosure*, No. 416150, Dec. 1998, pp. 1720-1721.

Mohan, C., "Workflow Management in the Internet Age", *Proceedings of the Second East European Symposium on Advances in Databases and Information Systems*, 1998, pp. 26-34.

Nyberg, K., "Workflow Definition Languages", [online], Nov. 21, 2000, retrieved from the Internet at <URL: cs.hut.fi/~kny/workflowlang/>.

Reinwald, B., "Structured Workflow Management with Lotus Notes Release 4", *Proceedings of the 41st IEEE Computer Society International Conference (CompCon)*, Feb. 1996, pp. 451-457.

Spitzer, T., "Forms, Workflow, and the Web", [online], [Retrieved on Mar. 17, 2005], retrieved from the Internet at <URL:webtechniques.com/archives/1999/10/busi/>.

Trammell, K., "Work Flow Without Fear", *Byte.com*, [online], Sep. 6, 2004, retrieved from the Internet at <URL:byte.com/art/9604/sec8/art1.htm>.

* cited by examiner

METHOD, SYSTEM, AND PROGRAM FOR ENABLING ACCESS TO A PLURALITY OF SERVICES

RELATED APPLICATIONS

This application is related to the following copending and commonly assigned patent applications, which are incorporated herein by reference in their entirety:

"Method, System, and Program for Generating a Workflow", having, and Ser. No. 09/894,074, and filed on Jun. 28, 2001;

"Method, System, and Program for Using Objects In Data Stores During Execution of a Workflow", having and Ser. No. 09/894,413, and filed on Jun. 28, 2001;

"Method, System, and Program for Executing a Workflow", having and Ser. No. 09/894,076, and filed on Jun. 28, 2001;

"Method, System, And Program For Enabling Access to a Plurality of Services", having, and Ser. No. 09/918,185; and "Method, System, and Program for Transferring Data from an Application Engine", having, and Ser. No. 09/918,204, and filed on the same date herewith.

BACKGROUND OF THE INVENTION

1. Field of the Invention

The present invention relates to a method, system, and program for enabling access to a plurality of services.

2. Description of the Related Art

A workflow program allows businesses and other organizations to define their business operations as a computer model known as a workflow. A workflow defines a series of processes to be performed by users at a client computer. The user activities at the client computers may involve updating an electronic form, reviewing information, etc. After one user in the workflow performs a specified action, the work item or other information is then routed to one or more further nodes where further action may be taken. For instance, an on-line purchase of a product may involve numerous steps, such as receiving the customer order, routing the customer order to the credit department to process the bill and then routing the order to the shipment department to prepare the shipment. Once the shipment is prepared, the product may be shipped and information on the purchase is then transferred to the customer service department to take any further action. Each of these processes may be defined as nodes in a workflow. A workflow program would then route the customer order to the business agents designated to handle the job. For instance, the initial order would be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow up action.

A workflow is designed using workflow software, such as the International Business Machines (IBM) MQSeries Workflow software product. Different vendors provide proprietary platforms for implementing workflows. Once a user designs a workflow model using a particular vendor product, they are often restricted to that vendor platform because their application programs are tied to the particular vendor implementations.

For these reasons, there is a need in the art to provide techniques for integrating products from different vendors in a federated environment.

SUMMARY OF THE PREFERRED EMBODIMENTS

Provided is a method, system, and program for enabling access to a plurality of service engines, wherein each service engine enables access to service resources. A plurality of service class implementations are provided for service engines from different vendors, wherein each service class implementation provides an implementation of methods and objects from a same abstract service class. A service object for one service engine is instantiated in response to at least one called method from one of the service class implementations, wherein the service object includes information on the service engine. Method calls from one service class implementation are received requesting information on service engine resources for one named service. The service object is used to access the requested information to return to the method call.

Still further, method calls are received from at least one application program including methods from at least one of the service class implementations to access information on at least one service from the service objects.

In further implementations, the services include workflow products from different vendors. In such case, the workflow service class implementations from different vendors each includes methods and objects from a same abstract workflow service class specifying methods and objects to include in all workflow service class implementations.

In further implementations, a method call is received for the user to connect specifying a user name, authentication information, and one service. In response, a connection object is instantiated if authentication passed including information on the specified user name, authentication information, and the service that can be accessed with the authentication. A handle to the connection object is returned for accessing the service specified in the connection object.

The described implementations provide a class architecture to enable access to multiple services in a system, where each service vendor provides an implementation of the class architecture for accessing information on their service resources.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
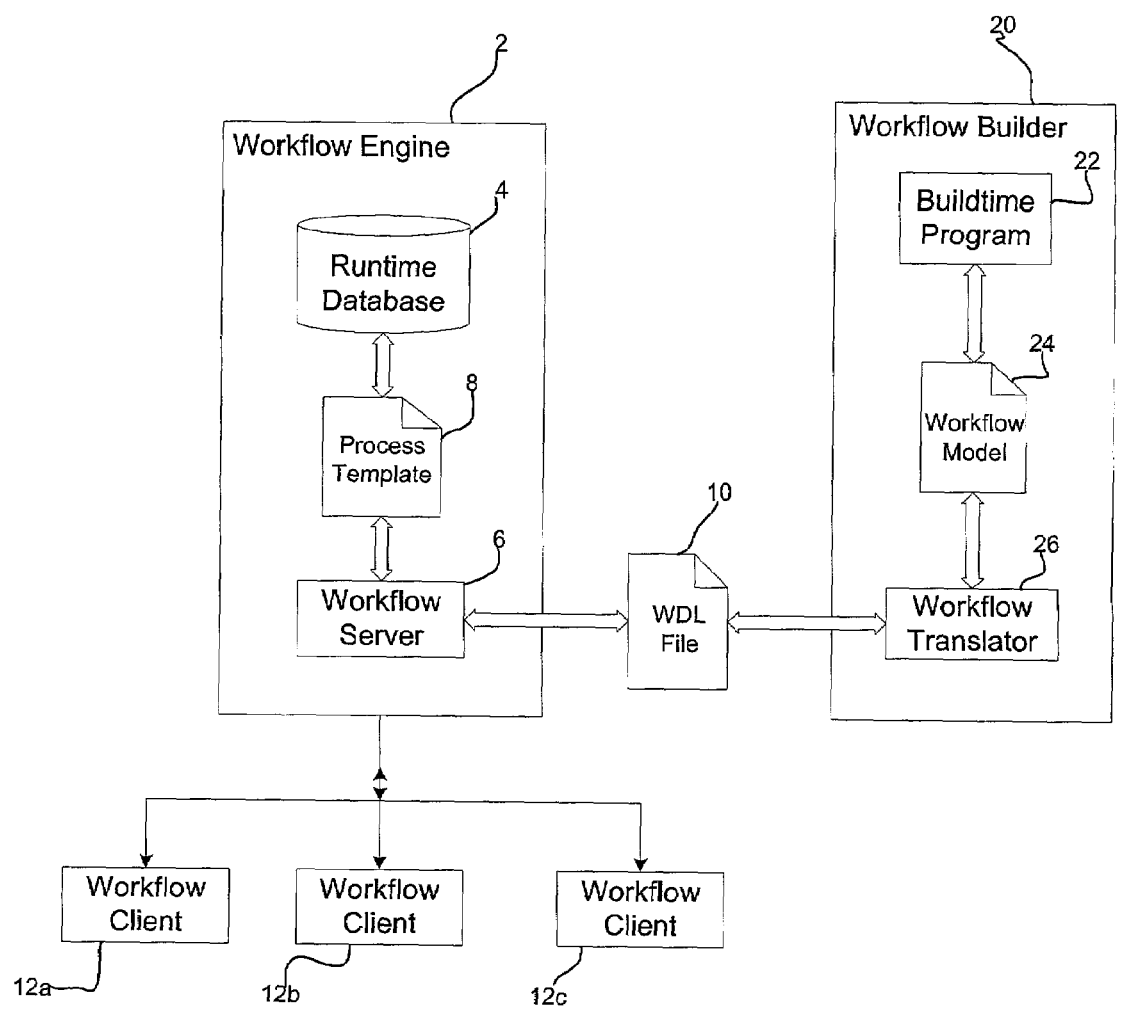
FIG. 1 illustrates a workflow computing environment in which aspects of the invention are implemented.

FIG. 1 illustrates a workflow environment implementation in which the invention is realized. A workflow engine 2 includes a runtime database 4 and a workflow server 6, such as the IBM MQSeries Workflow server. The workflow server 6 is capable of transforming a workflow model coded in a workflow definition language (WDL) file 10, such as FDL, into a process template 8 implemented in the runtime database 4. The runtime database 4 stores database tables that implement the data structures that provide the status and setup information needed for workflow process execution. Whenever the state of a process activity changes, such information is recorded in the runtime database 4. The runtime database 4 may be implemented using any database program known in the art, such as IBM DB2.**

**MQSeries, IBM, and DB2 are registered trademarks of International Business Machines Corp., Java is a trademark of Sun Microsystems, Inc.

The workflow server 6 coordinates and manages the execution of processes for a defined process template 8. The workflow server 6 executes any programs associated with a process defined for the workflow, interprets the process definitions, creates process instances and manages their execution, manages processes and states, logs events, communicates with users as part of the workflow, etc. The workflow server 6 may include a database client program (not shown) to access and update records related to the workflow being processed maintained in the runtime database 4. The workflow server 6 processing may be distributed across multiple computers to achieve workload balancing.

The workflow clients 12a, b . . . n represent the client computers that execute workflow application program interfaces (APIs) to perform workflow related actions and activities and return messages to the workflow server 6. The workflow clients 12a, b . . . n thus comprise instances of the workflow code on the client computers that allow users to interface with the executing workflow and the workflow server 6. The workflow server 6 would execute activity programs as part of executing the workflow and transmit messages and data to the workflow client 12 to request user action to proceed with the workflow. The actions associated with the nodes and executed by the workflow server 6 may comprise Java servlets. The workflow client 12 may comprise a Web browser capable of executing Java scripts transferred from the Java servlet executing on the workflow server 6. Further, details on implementations and interactions of the workflow server 6 and client 12 are described in the IBM publication "IBM MQSeries Workflow: Concepts and Architecture, Version 3.3", IBM document no. GH12-6285-03 (March, 2001), which publication is incorporated herein by reference in its entirety.

A workflow builder 20 comprises a system including a buildtime program 22 that implements a plurality of graphical user interface (GUI) panels in which a user may define the components of a workflow model 24. A workflow translator 26 converts the workflow model 24, with the defined workflow components, into a workflow definition language (WDL) file 10 that implements the workflow model 24. The workflow definition language (WDL) may comprise the FlowMark Definition Language (FDL), Workflow Process Definition Language (WPDL) or any other workflow definition language known in the art that is used to define workflows. The workflow translator 26 would transfer the WDL file 10 to the workflow server 6 to transform into a process template 8 in the runtime database 4 in a manner known in the art. Further details of using the buildtime program 22 to build workflows are described in the copending and commonly assigned patent application "Method, System, and Program for Generating a Workflow", having, and Ser. No. 09/984,074, which application was incorporated herein by reference above.

The workflow engine 2, and each of the program components therein, such as the runtime database 4 and workflow server 6, may be implemented in one or more computing machines. The workflow clients 12 which provide the workflow interface to users may be implemented on one or more client machines. The workflow builder 20, including the buildtime program 22 and workflow translator 26 programs, may be implemented on one or more computing machines. Any portion of the workflow engine 2, workflow builder 20, and/or workflow client 12, and program components therein, may be implemented on the same computing machines or separate machines. The computing machines used to implement the workflow engine 2, workflow clients 12, and workflow builder 20 may comprise any computing device known in the art, such as a server, workstation, mainframe, personal computer, laptop computer, hand held computer, telephony device, etc.

One use of a workflow is to generate a final product, which may comprise the result of the effort of a single business unit or the cumulative efforts of multiple users and units within an organization. To produce the final product, a workflow packet comprised of one or more documents would transfer through various user work stations in the company defined as nodes in the workflow to require the user associated with such node to handle and process and forward to another user to handle. A document is comprised of a multimedia item that has digital content.

For instance, an insurance company may have to process numerous documents related to an insurance claim, such as photographs, appraisals, expert reports, etc. Employees may spend a substantial amount of time sorting through documents and associating the documents with particular claims. In the workflow model, all the documents related to a single claim would be part of a work packet that may move through various user stations to review and process. The workflow would comprise the flow of work and actions that are performed on the documents or workflow packet by multiple users in the system.

The workflow defines the sequence and boundaries of how the work is performed with respect to the documents in the workflow packet, and any restrictions on the order in which documents in the workflow packet must be processed. For instance, before the claim can proceed to a further step, a claims adjuster might be required to ensure that certain documents are included in the workflow packet for the claim before the workflow packet can proceed to further nodes in the workflow, e.g., determining the amount of compensation.

In workflow terminology, a worklist is a queue of work items. Each work item comprises a unit of work for a node in the workflow that is performed by the users associated with that node. Each work item may be associated with one work packet, which comprises documents or objects that are processed during the work defined for that work item. When a user at one node accesses the work item to perform the work defined therein, that work item is locked, thereby preventing others at that node from accessing the work item.

A worklist, which is a queue of work for the users of the organization to perform with respect to the workflow packet. The work items within the worklist can be handled by any of the employees/users assigned to the worklist. An action list defines the actions that a user can perform on the work packet objects associated with the work item, such as selections or data that may be entered in the work packet. For example, an adjuster in the claim process workflow can select an option to continue consideration of the claim if it appears valid or select an option to reject the claim. The workflow further consists of the paths defined as the connections between nodes which indicate the order of execution of nodes in the workflow.

An action list may be associated with a workflow that provides a list the actions that can be invoked at the nodes in the defined workflow. The actions may comprise programs that are executed at a particular node. In certain implementations, the actions comprise Java methods that the workflow server 6 executes when control proceeds to the node with which the method is associated. Action in the list would be associated with particular nodes. An access list defines a mapping of users that can be assigned to nodes to perform the action associated with such node. An notification feature causes a message to be sent to a specified user if the user associated with a node has not performed the action defined for the node within a specified time frame.

One or more actions and a user with are associated with the work nodes in the workflow. The work nodes defined for the workflow may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary if the claim adjuster selects to reject the claim as opposed to approving the claim. A collection point node is a work node where certain documentation is gathered and added to the work packet. The collection node holds and manages work packages that cannot be processed completely until additional information is received. A document node represents a document in the workflow.

Figure 2:
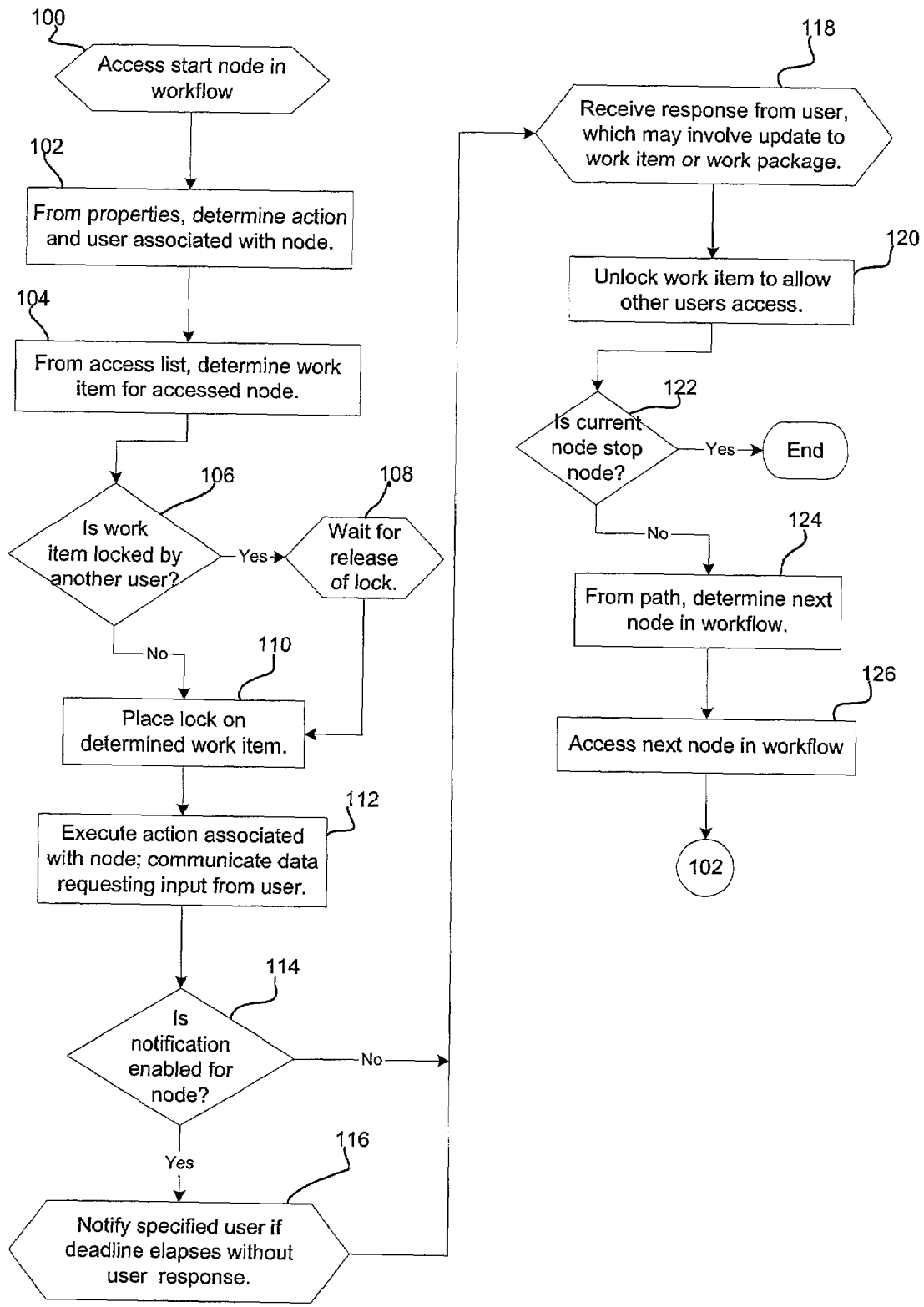
FIG. 2 illustrates logic performed by a workflow server to execute a workflow in accordance with implementations of the invention.

In certain implementations, the workflow model 24 defined using the buildtime program 22 is document centric in that the actions performed at the node concern the processing of work packages that may comprise any content or object that is processed and routed through the workflow. FIG. 2 illustrates the logic performed by the workflow server 6 to execute a workflow. When a user invokes a workflow stored in the runtime database 4, the workflow server 6 accesses (at block 100) the start node of the invoked workflow by interacting with the runtime database 4 in a manner known in the art. From the properties defined for that node, the workflow server 6 determines (at block 102) the actions and user associated with the node. The workflow server 6 further processes (at block 104) the access list defined for the workflow to determine the work item for the accessed node. If (at block 106) the determined work item currently accessed in the workflow is locked by another user at that node, then the workflow server 6 waits (at block 108) for the lock on the work item(s) to be released. If the work item is not locked or after the lock is released, control proceeds to block 110 where the workflow server 6 places a lock on the determined work item. The workflow server 6 then executes (at block 112) the action associated with the node and communicates data to the workflow client 12 of the determined user requesting user action.

If (at block 114) notification is enabled for the current node and the deadline has passed (at block 116) without receiving a response from the user, then the workflow server 6 notifies the user specified with the enable notification that the deadline has passed. Upon receiving (at block 118) a response from the user, which may comprise entering information, modifying a work item, adding a work item to the work package, selecting an option, etc., the workflow server 6 unlocks (at block 120) the work item(s) previously locked for the user. If (at block 122) the current node is the stop node, then control ends; otherwise, if there are further nodes to process in the workflow, then the workflow server 6 determines (at block 124) from the path from the current node the next node in the workflow and accesses (at block 126) the next node. Control then proceeds back to block 326 to process the next node.

The workflow logic of FIG. 2 provides a document centric workflow in that the state of processing work items associated with the node controls the workflow because control cannot proceed to other subsequent nodes that process the locked work item until the node holding the lock completes execution and releases the lock on the work item. Thus, access to work items controls the flow through the workflow.

With the described implementations, the workflow builder 20 generates a WDL file 10 that may be compatible with workflow engines from different vendors because different vendors may design their workflow engines to be compatible with the WDL format of the WDL file 10. This allows the workflow model defined in the WDL file 10 to be transportable across different vendor workflow engine platforms.

Object Oriented Workflow Architecture

Figure 3:
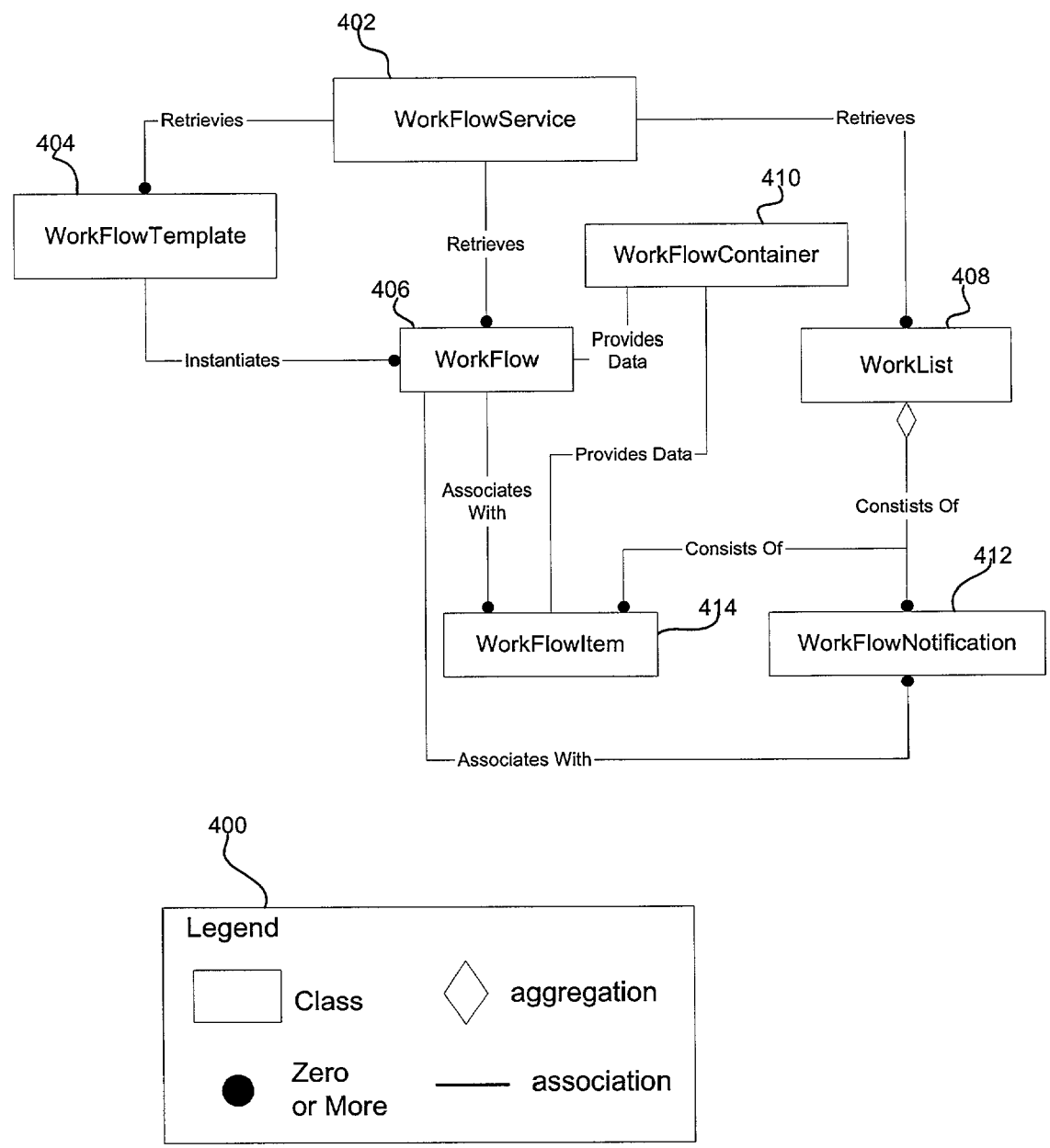
FIG. 3 illustrates an architecture of object oriented classes for implementing a workflow in accordance with implementations of the invention.

FIG. 3 illustrates an architecture of object oriented classes and their interrelationship that are used to implement a workflow of nodes. As indicated in the legend 400, a rectangle indicates a class; a line connecting classes indicates an association of the connected classes; a line connecting classes terminating in a filled circle indicates that there may be one or more instances of the class at the end with the circle for each instance of the class at the other end of the line; and a line terminating at a diamond indicates that the class at the diamond end is an aggregate, such that the aggregate object is made up of one or more instances of the class at the other end of the line. FIG. 3 illustrates the relationship of the classes.

The WorkFlowService class 402 is the starting point for a user wanting to access a workflow. The WorkFlowService class 402 includes methods that allow users to access already defined workflow templates and executing workflows. The WorkFlowService class 402 is associated with the WorkFlowTemplate 404, WorkFlow 406, and WorkFlowList

408 classes. The WorkFlowTemplate class 404 provides methods that allow the user to manipulate workflow process template objects, e.g., process template 8 (FIG. 1), which comprise a defined workflow that is stored in the workflow engine 2. The WorkFlow class 406 provides methods that allow the user to access information and control an executing workflow. The WorkList class 408 includes methods that allow the user to access an executing work list object comprised of work items and information on the current state of the executing work list, i.e., information on work items being processed. The methods in the WorkFlowService class 402 are used to retrieve information on particular workflows, workflow templates, and workflow lists associated with a particular workflow service. The methods from the other classes, such as the WorkFlowTemplate 404, WorkFlow 406, and WorkFlowList 408 classes, can then be used to obtain specific information and control over those workflow templates, workflows, and workflow lists identified by the WorkFlowService class 402 methods.

The WorkFlowTemplate class 404 provides information on a workflow template. A workflow object from the WorkFlow class 406 represents an executing workflow. The WorkFlowContainer class 410 includes methods to instantiate a container object that includes information on one container used to transfer data between nodes. Users at nodes may access data in the container and update the container with additional data. The data in the container may be used by the action being executed at a node. The WorkFlow class 406 is associated with the WorkFlowNotification class 412, which is used to provide notifications, such as notifications if a user does not perform an action at a node within a predefined time period. There may be many notifications provided for one workflow. The WorkFlow class 406 is further associated with the WorkFlowItem class 414, such that one executing workflow may be associated with one or more work items indicating a unit of work to perform for a node within the workflow. The WorkFlowItem class 414 is associated with the WorkFlowContainer class 410, such that one container may be used at a work item to provide data to the user executing the unit of work defined by the work item. The relationship between the WorkFlow class 406 and the WorkFlowItem class 414 indicates that there may be many work item objects associated with one executing workflow. The class architecture of FIG. 10 further illustrates that a workflow list of the WorkFlowList class 408 is an aggregate of the workflow from the WorkFlow 414 Item class and workflow notifications from the WorkFlowNotification 412 class.

Figure 10:
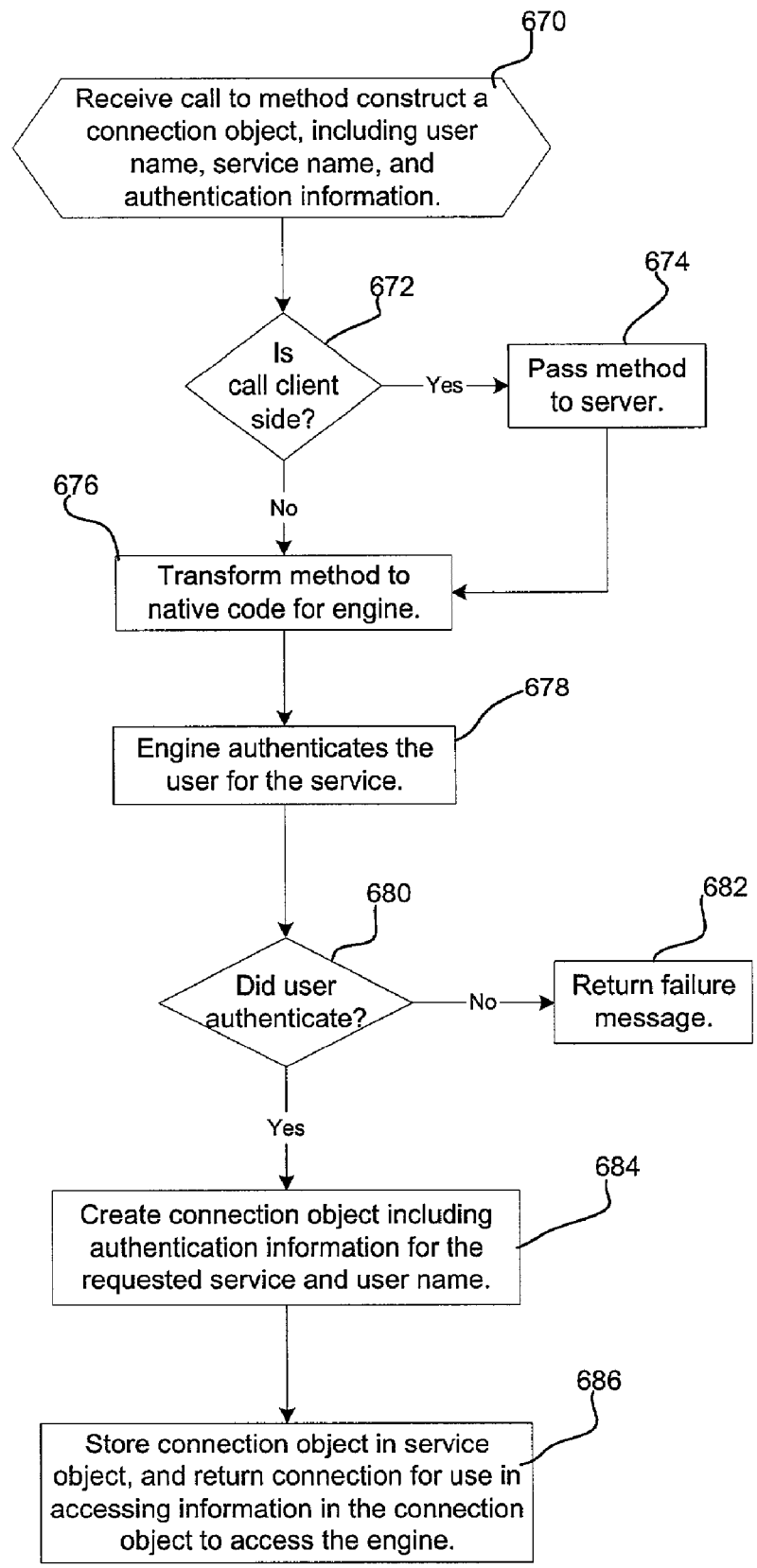
FIG. 10 illustrates logic to construct a connection object in accordance with implementations of the invention.

The above object oriented architecture of FIG. 10 defines how the different classes interrelate in order to implement a workflow. Each of the above interrelated classes 402, 404, 406, 408, 410, 412, and 414 provides interfaces/methods that may be used within a workflow computer program to implement the workflow and actions performed at a node. The workflow program would be executed by the workflow server 6 (FIG. 1) in the workflow engine 2.

Following are examples of some methods of the WorkFlowService class 402, including:

WorkFlowService( ): constructs a new workflow service, which provides access to different workflow services in the workflow engine 2 (FIG. 1). Each workflow service is associated with workflow templates, executing workflows, and workflow lists of work items for a workflow.

connect: provides a user name, authentication, and connection string to use to authenticate a user to provide access to a requested workflow service, which allows access to workflow templates, work lists, etc.

connection: handle returned to a user to allow access to a particular workflow service.

setDatastore: a reference to a data store including documents and objects used by the work items in the workflows associated with the workflow service. Thus, different workflows for a workflow service may process documents within workflow packages from the same data store.

listWorkFlows: returns a list of all workflow objects of the WorkFlow class 406.

listWorkLists: returns a list of all work list objects of the WorkFlowList class 408.

listWorkFlowTemplates: returns a list of all template objects of the WorkFlowTemplate class 404.

Following are examples of some methods of the WorkFlowService class 402, including:

WorkFlowTemplate( ): constructs a workflow template object including a defined workflow. This workflow template may be created using the GUI panels and buildtime program described above.

name: returns name of a workflow template.

description: returns a description of the work performed by a workflow template.

modifiedTime: time the workflow template was last modified.

Following are examples of some methods of the WorkFlow class 406, including:

WorkFlow( ): constructs a workflow object representing a workflow comprised of nodes and work items for a specified workflow. The workflow may also be provided a container that is used to allow users of different work items to communicate and/or a work packet comprised of one or more documents or objects to be processed as part of the workflow.

get/setName: returns or sets the name for a workflow.

workFlowTemplateName: returns the name of the workflow template associated with the workflow.

notificationTime: returns the time of the last notification generated for the workflow in response to a user not performing an action for one accessed node within a specified time period.

modifiedTime: Returns the last time the workflow was modified.

stateChangeTime: returns the last time a state change occurred with the workflow:

startTime: returns the time the workflow was started.

endTime: returns the time the workflow ended.

state: returns a state of the workflow, such as ready, running, finished, terminated, suspended, terminating, suspending, deleted, etc.

inContainer: returns the input container associated with the workflow.

start: starts a workflow with a container if the state is ready.

terminate: terminates the workflow if the state is running, suspended, or suspending.

suspend: suspends the workflow if the state is running.

resume: resumes a suspended workflow if the state is suspended and suspending.

add: adds a workflow to the system that is associated with one specified workflow template.

Following are examples of methods of the WorkFlowContainer class 410, which instantiates a container object used with a workflow to transport information among the nodes.

WorkFlowContainer( ): constructs a container object for a container used within a particular workflow.

get/setPriority: get/sets the priority for an item in the container.

get/setActivityNode: get/sets the current node being processed, may also get/set information on the current activity node.

get/setWorkPacketID: get/sets an identifier of a work packet being routed through the system.

get/setActionPerformed: get/sets information on an action being performed.

get/setUserVariable: get/sets a variable maintained in the container, that may have predefined values. The priority is maintained for a user variable in the container.

retrieve: retrieves and refreshes the container.

update: updates the container data.

Following are examples of some methods of the WorkList class 408, where a work list object is a representation of a work list in the system. As discussed, a work list object comprises a collection of work items and notifications for an executing workflow.

WorkList( ): constructs a work list object for a specified work list. A work list consists of work items.

get/set ACLName: get/sets the action control list (ACL) name for the work list including the actions that may be performed as part of units of work for the work list.

listWorkItems: lists the work items on the work list.

listWorkItemsByTemplate: returns the work items for the work list by the specified workflow template name.

listWorkItemsByNode: returns a list of the work items assigned to each node in the work flow.

listProcessNotifications: lists notifications generated during workflow that are associated with the workflow process. For instance, the notification enabled through the GUI in FIG. 3 provides a general notification for the workflow. In certain implementations, a notification process is activated and performed as a background process to generate notifications.

listActivityNotifications: lists notifications generated during workflow that are associated with a particular activity, such as a user not performing an activity within a specified time. For instance, the notification enabled through the GUI of FIGS. 4 and 5 enables notifications for activities at particular nodes.

add/update/delete/retrieve: separate commands that allow user to add, update, delete, and retrieve a work list.

Additional commands may be provided to access the information in the work list, such as filter commands to provide filters for accessing information from the work list, thresholds of the number of items that can be in the work list, etc.

Following are examples of some methods of the Work-FlowItem class 414, where a work item object represents a unit of work performed in the workflow. The following methods are used to create and modify work items, and obtain information thereon.

WorkFlowItem( ): constructs a work item for a specified workflow, node, and owner.

name: returns the name of the node to which the work item is assigned.

state: returns a state of the work item, such as not set, ready, running, finished, terminated, suspended, disabled, checked out, in error, executed, etc. A work item is checked out when a user has accessed the work item to perform the actions defined for the work item.

workFlowName: returns the name of the workflow including the work item.

workFlowTemplateName: returns the name of the workflow template including the work item.

priority, owner, notificationTime, startTime, creationTime modifiedTime: methods that return information on the priority, owner, time of last notification, time of creation and time of last modification for a work item, respectively.

retrieve, start, finish: methods used to retrieve, begin executing, and complete a work item, respectively.

checkIn, checkOut: checkOut locks a work item to prevent other users at a node from accessing the work item and changes the state of the work item to checked out. Upon check out, the container associated with the work item is accessed from the previous node using the inContainer method. The checkin method receives the completed work item from the user, releases the lock, and provides the container to route to the next node.

inContainer: method that obtains container from previous node for use with work item checked out at current node being processed.

outContainer: method generates an out container to include contents of container user accessed at work item, including any changes made by the user to the data in the container. A handle of the out container is generated and provided with checkOut method called for the next node to provide that container to the user of the next node in the workflow.

Following are examples of some methods of the WorkFlowNotification class 412, where a notification object represents a generated notification. The following methods are used to create and modify notifications, and obtain information thereon.

WorkFlowNotification( ): constructs a notification object having a specified notification name, notification type, and owner name for a specified workflow service and workflow. The notification type indicates how the owner is notified.

state: returns a state of the notification, such as not set, ready, running, finished, terminated, suspended, disabled, etc.

priority, owner, notificationTime, startTime, creationTime, modifiedTIme, receivedTime: these methods return the priority of the notification, owner of the notification, time that must elapse before the notification is generated, time the notification started, time the notification was crated, time of last notification to the notification, time the notification was received, respectively. The notification would be started and executed as a background process.

receiveReason: returns a received reason for the notification.

retrieve, cancel: methods that retrieve and cancel a notification, respectively.

transfer: transfers a notification to a specified user. In this way, a notification can be transferred from the current owner to some other user.

The above described methods and classes would be included in a workflow program executed by the workflow server 6 (FIG. 1) to execute the workflow. The methods described above would be used to access and modify the workflow related objects, such as the workflow, work items, notifications, containers, etc. when running the workflow. The above described methods may also be used in other programs that can obtain information and status on a workflow.

Figure 4:
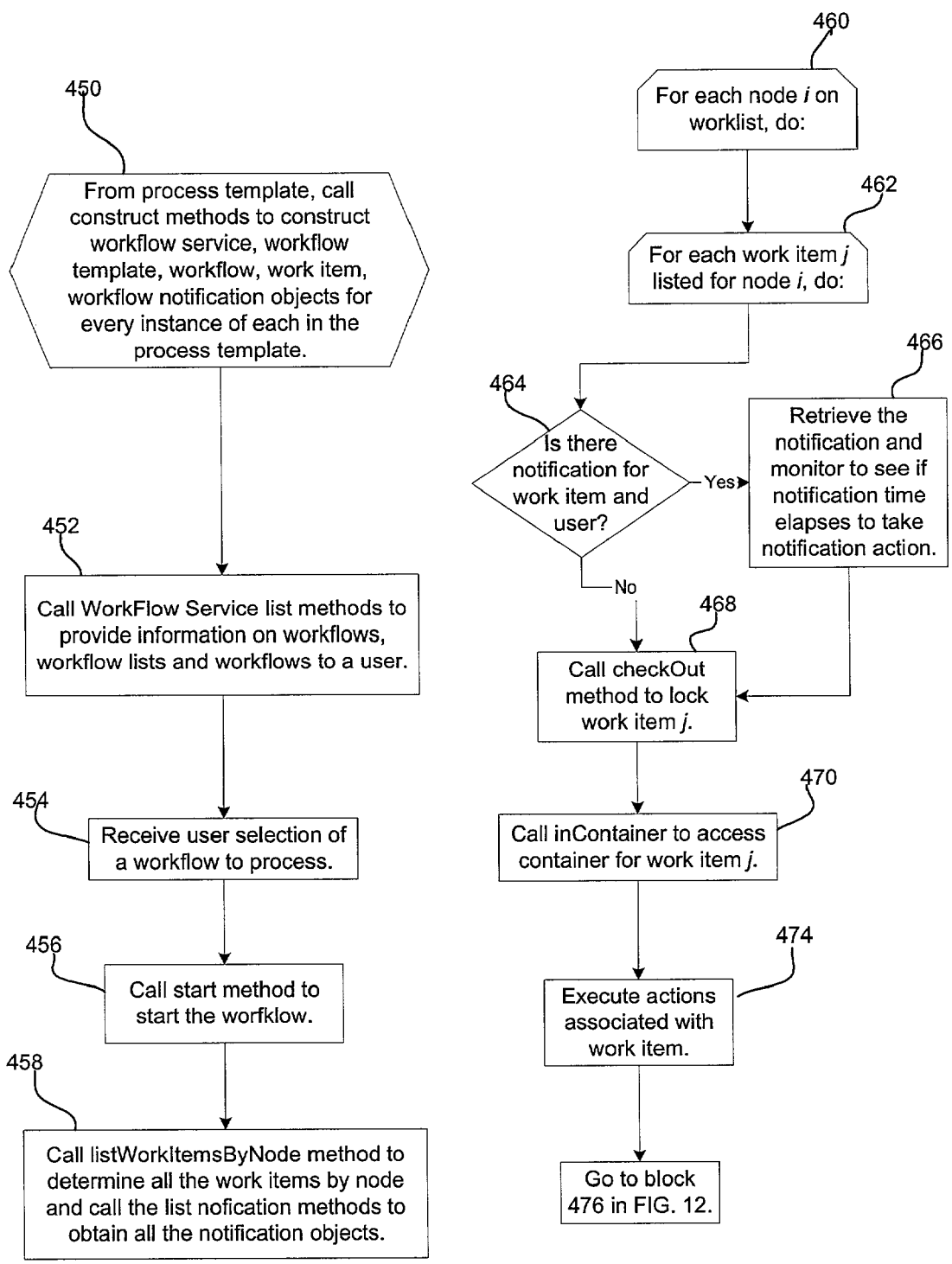
FIGS. 4 and 5 illustrate logic to utilize the methods and objects from the object oriented class architecture of FIG. 3 to execute a workflow in accordance with implementations of the invention.
Figure 5:
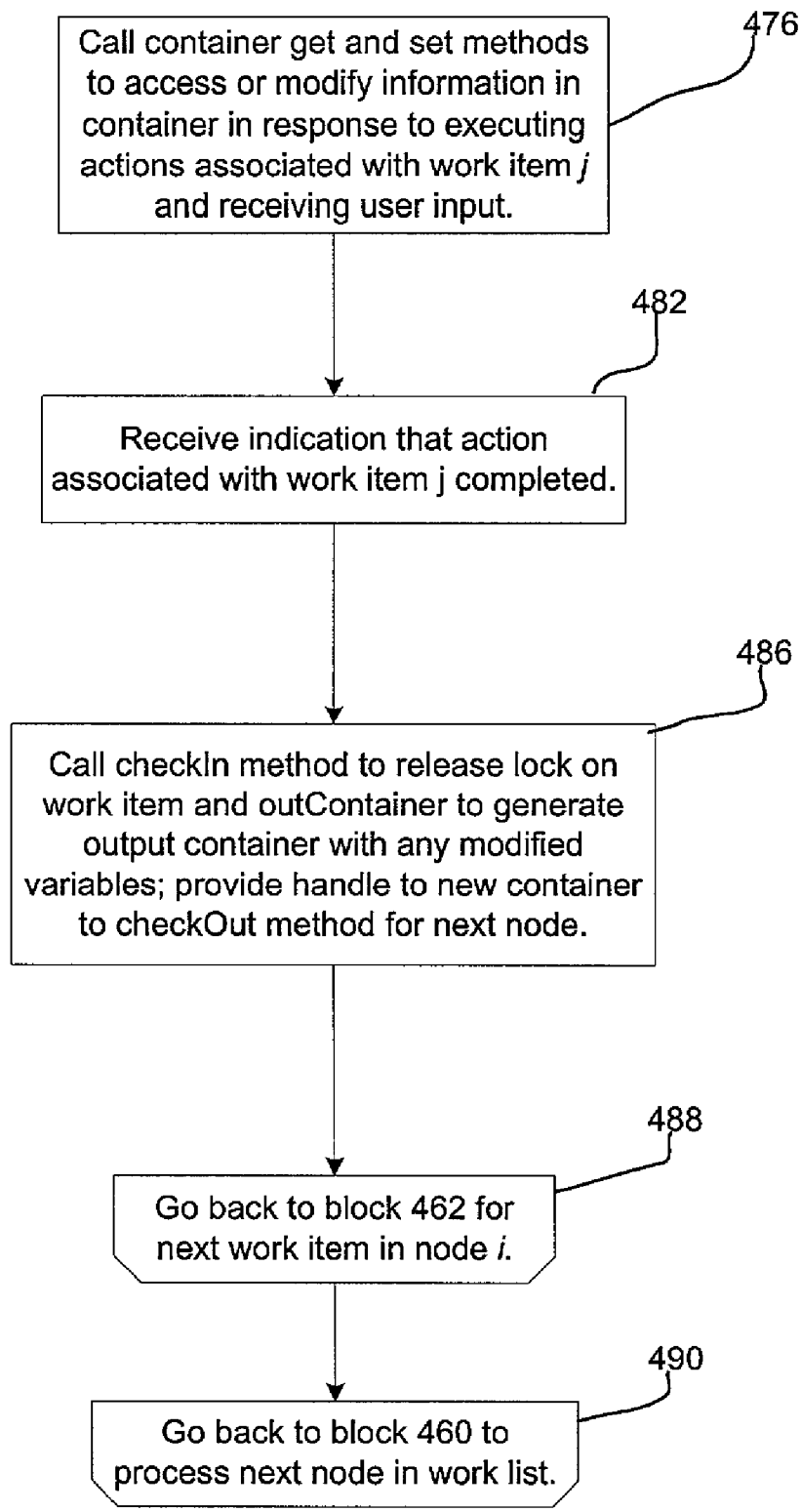

FIGS. 4–5 illustrate an example of program logic in a workflow program executed by the workflow server 6 (FIG. 1) utilizing the above discussed methods to implement a workflow. With respect to FIG. 11, control begins at block 450 where the program calls the constructor methods, WorkFlowService( ) to construct a workflow service object. The workflow program would then call (at block 452) the WorkFlowService list methods, such as listWorkFlows, listWorkLists, listWorkFlowTemplates, to obtain information on the workflows, workflow templates, and work lists for a workflow service. This information may then be presented to a user for selection. Various other methods in the classes may be called to access information on the workflow to present to the user when making a decision on which workflow to execute.

At block 454, user selection of a workflow to process is received. The workflow program then calls (at block 456) the WorkFlow start method to start the workflow. The workflow program then calls (at block 458) the listWorkItemsByNode method to obtain all the work items for the started workflow, and the nodes to which the one or more items are associated. The workflow program then performs a loop at blocks 460 through 490 for each node i in the workflow, as determined from the list of work items by node. For each node i, the workflow program performs a loop at block 462 to 488 for each work item j associated with node i. If (at block 464) there is a notification for the work item and the user that is the owner of the item, as determined from the methods, then the workflow program retrieves (at block 466) retrieves the notification and then starts a monitor to determine if the time period for the notification has elapsed without the work item completing. From block 464 or 466, the workflow program calls (at block 468) the checkOut method to lock the work item j. The inContainer method is called (at block 470) to access any container associated with the work item j. Once the work item j is locked, the workflow program then executes (at block 474) the actions associated with the work item j.

Control then proceeds to block 476 in FIG. 5, where the workflow program calls container get and set methods to access or modify the data and variables in the container accessed for the work item j in response to executing actions assigned to that work item j. For instance, as part of performing actions for a work item, the user of the work item may read and write data to the container. The workflow program receives (at block 482) indication from a user that the actions associated with the work item have completed. The workflow program further calls (at block 486) the checkIn method to release the lock on the work item j and the outContainer method to generate a new container including any updates to provide to the user at the next node in the workflow. The handle to the new container would be used in the next called checkOut method to provide the container to the user at the next node of the workflow. If there are further work items for the node i, then control proceeds (at block 488) back to block 452 to retrieve the next work item. After completing all the work items for node i, control proceeds (at block 490) back to block 460 to process the next node in the work list.

The above described logic utilized workflow related classes and the methods therein to implement a workflow and obtain information thereon. The workflow server 6, or some other component in the workflow engine 2 (FIG. 1), would then translate the workflow objects and methods into application specific commands, such as Structured Query Language (SQL) commands to manipulate the data in the runtime database 4 and process template 8 to obtain information on the workflow and implement workflow operations.

Enabling Access to Heterogeneous Services

The above described architecture described how programmers in a client/server worfklow environment can write application programs to perform worfklow related operations using an object oriented class architecture. Further implementations provide methodologies for allowing a client application program to utilize heterogeneous services, e.g., a workflow program, search engines, a data repository and program for accessing a data repository (such as the IBM Content Server*) etc., from different vendors. A service is a set of functionality or program that may be accessed and executed, such as a workflow program.

Figure 6:
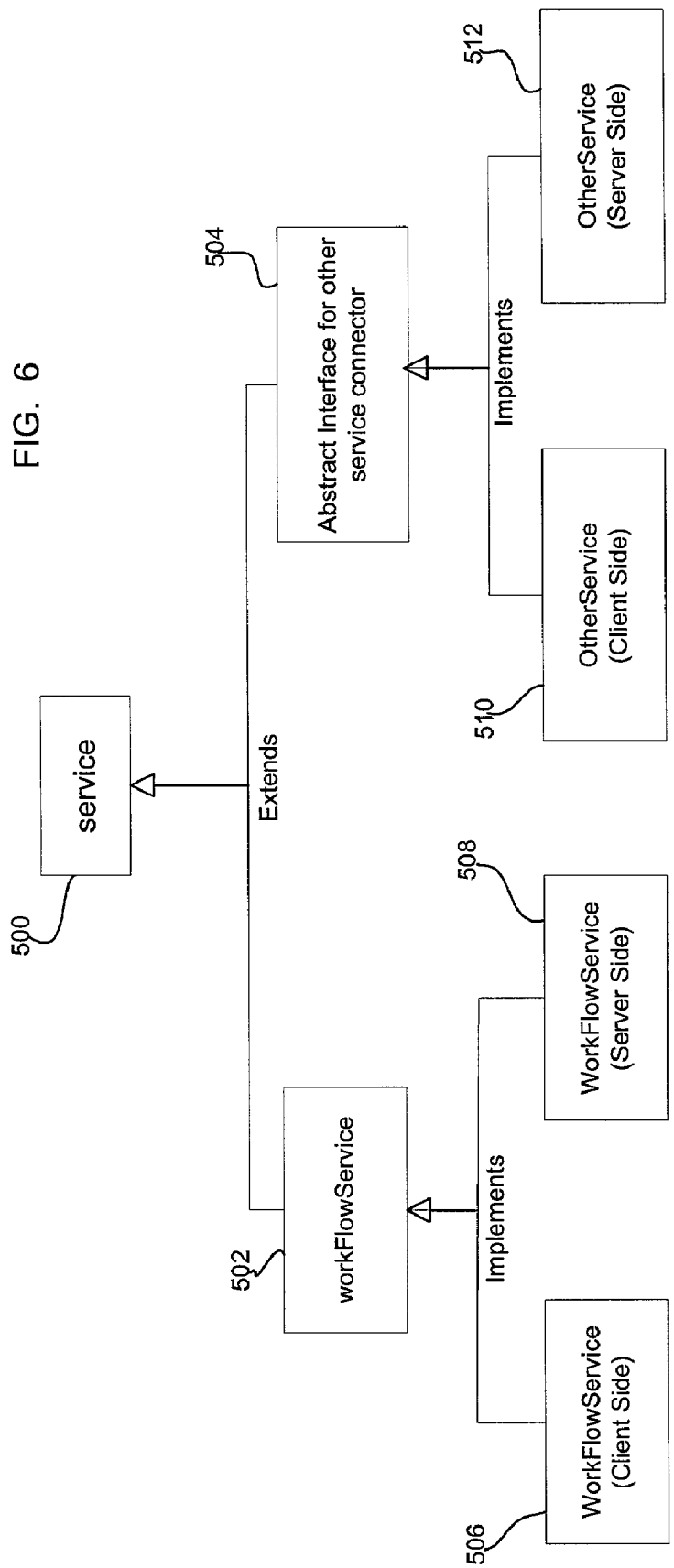
FIG. 6 illustrates an architecture of object oriented classes for implementing workflow services for heterogeneous services in accordance with implementations of the invention.

FIG. 6 illustrates an architecture of a client/service server framework to provide access to different types of service programs from different vendors. The architecture provides an abstract service class 500 that implements different abstract service types, a workFlowService class 502 and another service class type 504. The general abstract service class 500 provides methods and objects that all services, e.g., workflow engine vendors, search engine vendors, database program vendors, etc., must implement to make their services available to users, such as client and application programs, of the client/server architecture described herein. The abstract service type class 502 and 504 provides methods and objects that all services of a particular type must implement such as the methods and objects that all workflows must implement, all search engines must implement, etc. The WorkFlowService server 506 and client 508 side classes provide the methods and objects for one vendor implementation of a workflow service and OtherService client 510 and server 512 classes provide the methods and objects for one particular implementation of another type of service, e.g., a search engine, etc.

In FIG. 6, a line connecting two classes 500, 502, 504, 506, 508, 510, 512 represents an association between the two classes connected by the line, the triangle arrow on one end of the line indicates that the class at the other end of the line inherits the attributes of the class pointed to by the arrow. Thus, abstract workFlowService class 502 inherits the attributes of the abstract service class 500 and the WorkFlowService classes 506 and 508 inherit the attributes of the abstract workFlowService class 502, which would include the parent service class 500.

Figure 7:
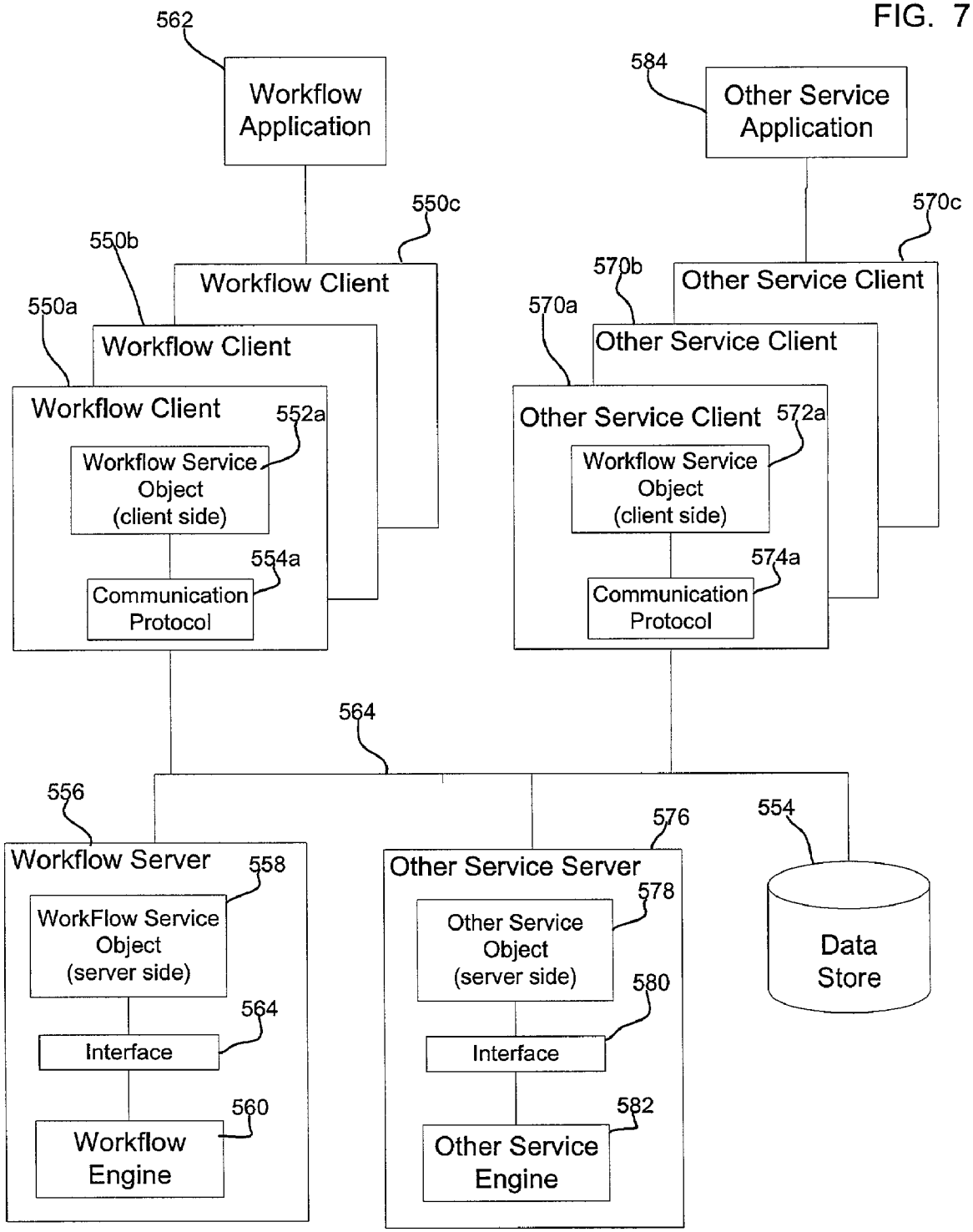
FIG. 7 illustrates an implementation an environment for enabling access to heterogeneous services in accordance with implementations of the invention.

FIG. 7 illustrates further details of an implementation of the client/server architecture for enabling access to different services from different vendors using the class architecture described with respect to FIG. 6. A plurality of workflow clients 550*a, b, c* comprise client computers, such as workstations, laptops, or any other computing device known in the art. Each workflow client 550*a, b, c* would include an instance of a workflow service object 552*a, b, c* (only 552*a* in client 550*a* is shown) instantiated from the WorkFlowService (client side) class 506. Each workflow client 550*a, b, c* includes a communication protocol 554*a, b, c* (only communication protocol 554*a* in client 550*a* is shown) that enables communication between the workflow client 550*a, b, c* and a workflow server 556. The communication protocol 554*a, b, c* comprises a network communication protocol known in the art, such as the Remote Method Invocation (RMI), CORBA, DCOM, etc., is used to enable communication between methods and objects in the WorkFlowService client 556 to the server side 558. The workflow clients 550*a, b, c* would communicate with the workflow server 556 over a network 564.

The clients 550*a, b, c* further include a translator to execute methods in the WorkFlowService (client side) 506 class. For instance, if the WorkFlowService (client side) 506 class is implemented in an object oriented language, such as Java, then the client 550***a, b, c* would include a translator, such as a Java Virtual Machine (JVM), to translate the method statements to executable code.

**MQSeries, IBM, and DB2 are registered trademarks of International Business Machines Corp., Java is a trademark of Sun Microsystems, Inc.

The workflow server 556 includes a workflow service object (server side) 558 that maintains information on a particular vendor implementation of a workflow engine 560. The workflow server 556 may comprise one or more server systems, workstations, or any other computing device known in the art. The workflow service object (server side) 558 is instantiated using classes and methods from the WorkFlowService (server side) class 508 for the particular workflow engine 560. In certain implementations, a user or workflow application 562 could execute methods from the WorkFlowService (client side) 506 class at the workflow client 550*a, b, c* to access information from the workflow service object (client side) 552 or from the workflow engine 560. In response, such methods would be communicated via the communication protocol 554*a, b, c* to the workflow server 556 for execution as methods in the WorkFlowService (server side) class 508. Such client methods may be executed against the workflow service object 558 for information maintained in the workflow service object 558, such as information on the type or category of the workflow engine 560 and a connection, or executed against the workflow engine 560.

In the described implementations, the WorkFlowService (client side) 506 and WorkFlowService (server side) 508 implement the same methods, with the exception that methods called on the client side are transferred via the communication protocol 554*a, b, c,* 574*a, b, c* to the server 556, 576 for execution thereon.

Methods invoked on the workflow server 556 from the WorkFlowService object (server side 558) are translated by a program interface 564 to the native code used by the workflow engine 560. The program interface 564 for translating methods from the WorkFlowService (server side) class 508 to native code may comprise a Java Native Interface (JNI), or any other program known in the art for providing a translation from one language to native code used by the target program or service.

Alternatively, method calls may be initially made on the workflow server 556, thereby avoiding the need for communication through the communication protocol 554.

A workflow application 562 is written in a computer language, such as an object oriented language, e.g., Java, C++, etc., and includes code to implement a workflow using methods and objects from the WorkFlowService classes 506, 508.

In the described implementations, each workflow vendor wanting to make their workflow engine 560 product available to users of the architecture would have to develop methods and classes implementing an instance of the WorkFlowService (client side) 506 and (server side) 508 classes, which implement the abstract workFlowService class 502, including at least the methods and objects of the abstract workFlowService 502 and service 500 classes. In certain implementations, the vendors would utilize the same programming language to provide their WorkFlowService 550*a, b, c* implementation to users of the architecture, such as the Java programming language. The program interface 564 would then translate the vendor implementation of the WorkFlowService 550***a, b, c* to the native code of their workflow service 556.

**MQSeries, IBM, and DB2 are registered trademarks of International Business Machines Corp., Java is a trademark of Sun Microsystems, Inc.

Similarly, other service clients 570*a, b, c* comprise computers including an other service object (client side) 572*a, b, c* instantiated from the OtherService (client side) class 510. Calls at the client side would be communicated via a communication protocol 574 to one other service server 576, including an other service object (server side) 578 instantiated from the OtherService (server side) class 512. An interface 580 translates the methods from the OtherService (server side) class 510 to the native code of the other service engine 582, such as a search engine or any other server-type application program known in the art. An other service application 584 includes methods from the OtherService (client side) 510 or (server side) 512 classes to obtain information from the other service objects (client side) 572 or (server side) 578) or the other service engine 582 in the same manner described with respect to the workflow service implementation.

Moreover, one client may utilize the methods from multiple client side service classes, e.g., from the WorkFlowService (client side) class 506 and the OtherService (client side) class 510 to access both service engines, e.g., one workflow service engine and one search engine, from a same client. Still further one application program may include methods to access different services.

Thus, the abstract classes 500, 502, and 504 provide the methods and objects that any service participating in the heterogeneous service environment must implement.

The service objects (client side) 558 and 578 include information about one connection and the service, e.g., workflow engine 560 or other service engine 582. In certain implementations, one workflow service object (client side 552 and server side 558) or other service object (client side 572 or server side 578) is maintained for each active and authenticated connection to the workflow engine 560 and other service engine 582.

In certain implementations, all of the programs and objects shown in FIG. 7 are implemented in a distributed computing system including numerous connected computing machines.

Following are examples of some methods and objects in the abstract service class 500, including:

connect( ): this method takes as parameters a service name, user name, authentication, and an optional connection string. The method authenticates the user having the user name and authentication with the named service. If the user authenticates, then connection information is generated and the handle is returned that addresses the authentication information for the user. The connection information would be stored in one service object 558, 578. The user would use the handle to the connection information when requesting information from the engine 560, 582. The targeted engine 560, 582 would then use the handle to verify the user's authentication information to determine if the user is authorized access to the requested resource provided by the engine 560, 582. The handle may subsequently be used to allow the user to access authentication information without having to go through the authentication process each time the user requests resources from the engine 560, 582.

disconnect( ): voids the authentication so that the handle that was provided no longer enables access to the engine 560, 582.

serviceName( ): returns the name of a service at the engine 560, 582.

serviceType( ): returns information on a type of engine 560, 582, e.g., workflow, search engine, etc., by the vendor providing the service.

serviceCategory( ): returns information distinguishing the category of a engine 560, 582, e.g., workflow, search engines, etc.

userName( ): returns the user name associated with a connection handle.

isConnected( ): returns a boolean value indicating the connection status for a connection handle.

Following are examples of some methods and objects in the abstract workFlowService 502, including:

getDatastore( ): returns a reference to a data store 554 associated with a service defined for the engine 560, 582.

listWorkFlows( ): returns a list of workflow objects, such as workflow objects created using the WorkFlow class 406 methods discussed above with respect to FIG. 3.

listWorkTemplates( ): returns a list of workflow template objects, such as workflow template objects created using the WorkFlowTemplate method discussed above as part of the WorkFlowService class 402.

listWorkLists( ): returns a list of work list objects, such as work list objects created using the WorkList class 408 discussed above with respect to FIG. 3.

The vendor implemented WorkFlowService classes 506 and 508 includes the methods and objects discussed with respect to the WorkFlowService class 402 discussed above and also includes the methods and objects discussed above with respect to the abstract service 500 and workFlowService classes 502. Similarly the vendor implemented OtherService 510, 512 classes would implement the abstract class 500 as well as methods and objects needed to enable access to information in the service objects providing information on one engine 560, 582. c. For instance, the OtherService 510, 512 classes would include methods to connect to the other service and access the resources of the engines 560, 582.

Following are examples of some methods and objects in the implementation of the WorkFlowService classes 506 and 508, including:

WorkFlowService( ): constructs a workflow service object 552a, b, c, 558. Each workflow service object includes information on groupings of resources available at one workflow engine 560, e.g., a name of the service, category, type, connection information, etc.

connect( ): constructs a connection handle object including the authentication information a user needs to connect to one service engine 560, 582. A connection object would be stored within one of the workflow service objects (server side) 558.

Figure 8:
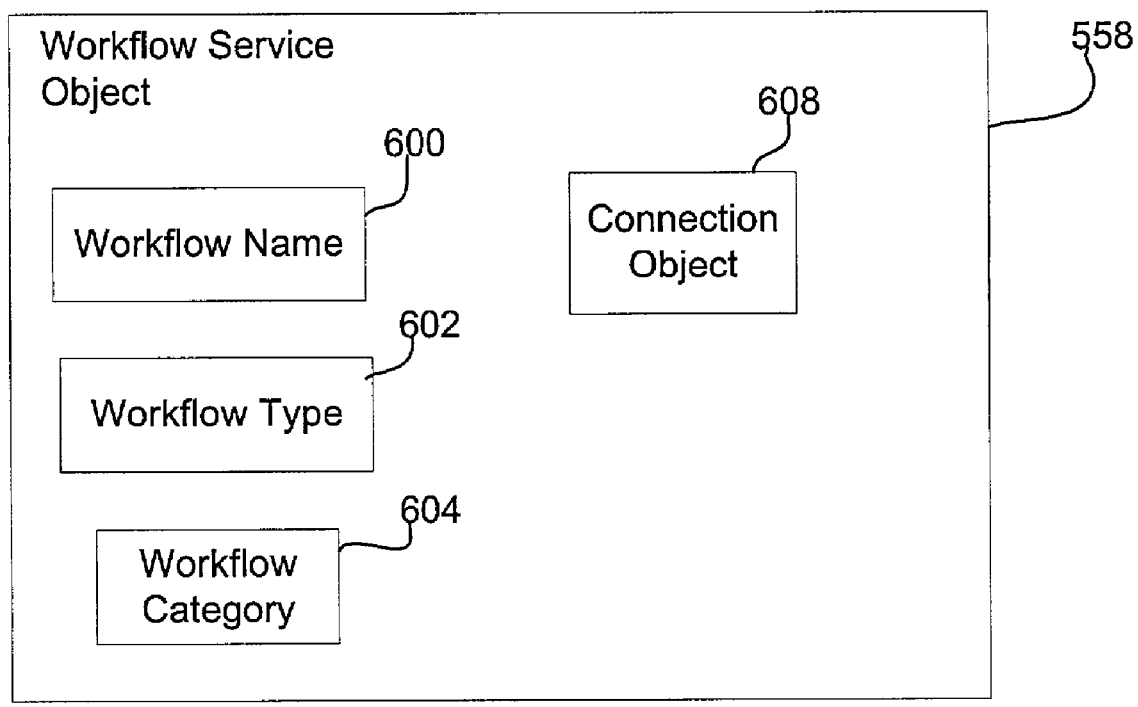
FIG. 8 illustrates an example of a service object maintaining information on services in accordance with implementations of the invention.

FIG. 8 illustrates details of the information maintained within the workflow service object (server side) 558, including a workflow name 600, workflow type 602, workflow category 604, and a connection object 608. Information in the workflow service object (server side ) 558 is accessed using the methods of the WorkFlowService (client side) 506 and (server side) 508 classes. As discussed, in certain implementations, the workflow service object (client side 552a, b, c) does not include specific information, and instead comprises a proxy object for method calls from the WorkFlowService (client side) 506 class that are communicated to the workflow server 556 and implemented through the WorkFlowService (server side) 508 class against the workflow service object (server side) 558. There would be a separate instance of a workflow service object (client side and server side) for each connection to the workflow engine 560, such that each workflow service object maintains information on only one connection. In alternative implementations, one service object may maintain multiple connection objects for different connections.

Figure 9:
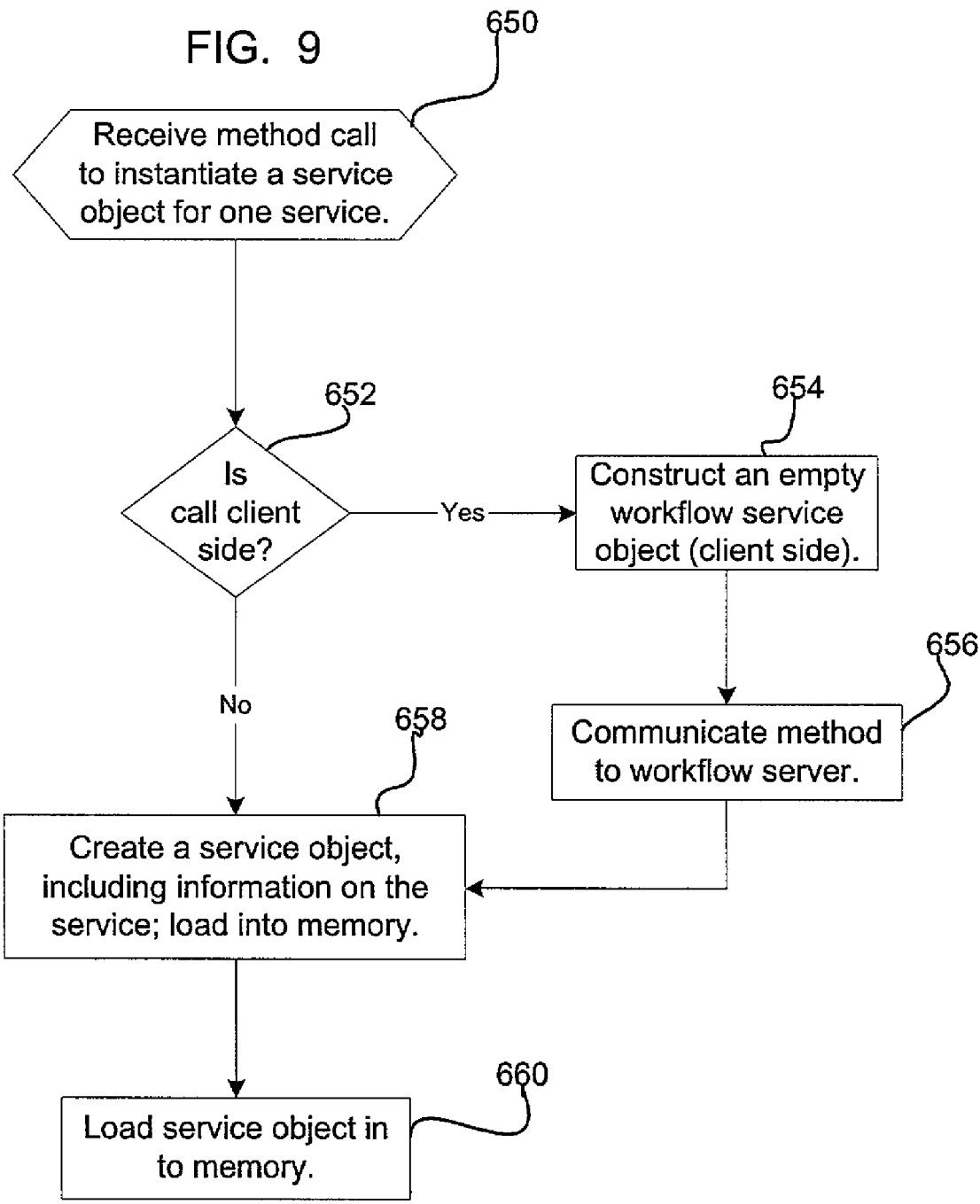
FIG. 9 illustrates logic to construct a service in accordance with implementations of the invention.
Figure 11:
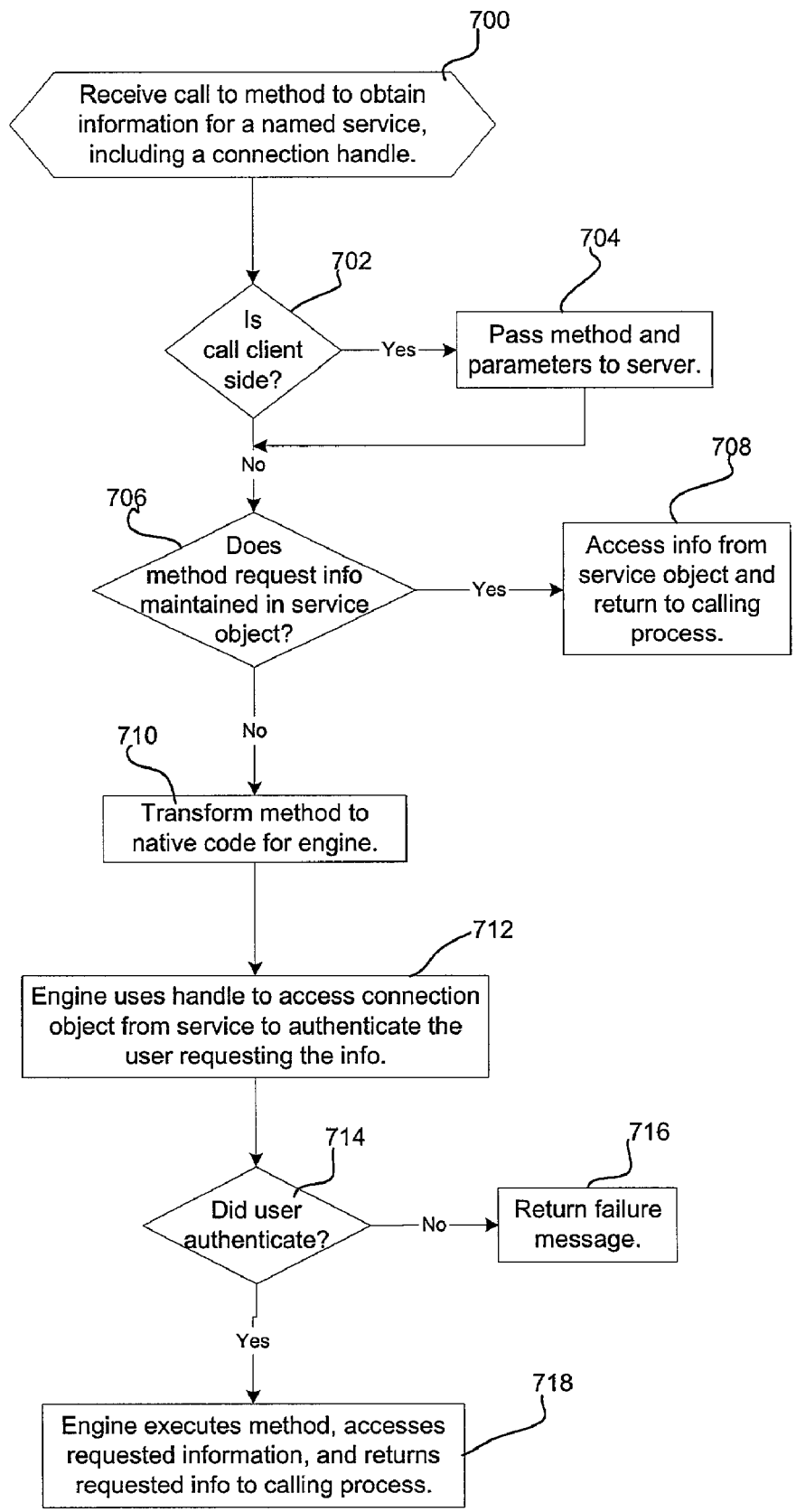
FIG. 11 illustrates logic to access information on a service in accordance with implementations of the invention.

FIGS. 9, 10, and 11 illustrate logic implemented in the methods of the service classes (client side) 506, 510 and (server side) 508, 512. In certain implementations, the service classes are implemented in an object oriented programming language, such as Java, C++, etc., and the clients 550a, b, c, 570a, b, c and servers 556 and 576 would include platforms capable of executing the methods of the service classes. For instance, if the service classes are implemented in Java, then the clients 550a, b, c, 570a, b, c and servers 556, 576 would include Java Virtual Machine (JVM) code to execute the methods of the service classes.

FIG. 9 illustrates logic implemented in the WorkFlowService( ) and OtherService( ) methods to instantiate a service object in the service classes (client side) 506, 510 and (server side) 508, 512 to instantiate client side 552a, b, c, 572a, b, c and/or server side 558, 578 service objects, respectively. Control begins at block 650 where a method call is received to construct a service object. If (at block 652) the method call is at the client 550a, b, c, 570a, b, c, then the method call causes the clients 550a, b, c, 570a, b, c, to construct (at block 654) a client side service object 552a, b, c, 572a, b, c and communicate (at block 656) the method to the workflow server 556. If the method call was invoked at the server 556 (from the no branch of block 652) or from block 656, then the method call would cause the server 556, 576 to instantiate (at block 658) a server side service object 558, 578 and load (at block 660) the instantiated service object into memory. Once the service object is instantiated, the client applications 562, 584 can then issue method calls to access information from the engines 560, 582 using the instantiated service object.

FIG. 10 illustrates logic implemented in the connect( ) method to instantiate a service object in the service classes (client side) 506, 510 and (server side) 508, 512 to construct connection object 608 (FIG. 8). Control begins at block 670 upon receiving a call to construct a connection object, including as parameters, a user name, service name, and user authentication information. If (at block 672) the call is client side, i.e., at the clients 550a, b, c, 570a, b, c, then the connect( ) method is passed to the server 556, 576 via the communication protocol 554a, b, c, 574a, b, c. From the no branch of block 672 or from block 674, the server 556, 576 executes (at block 676) the connect( ) method and calls the interface 564, 580 to transform the method to the native code of the engine 560, 582. The engine 560, 582 then attempts authentication (at block 678) for the user requesting access to the engine 560, 582 resources. If (at block 680) the user access attempt did not authenticate, then the engine 560, 582 returns (at block 682) a failure message. Otherwise, if authentication succeeded, then the engine 560, 582 instantiates (at block 684) a connection object 608 (FIG. 8) including authentication information for the requested service and user name. The connection object 608 is then stored (at block 686) in the service object 552a, b, c, 572a, b, c, and a connection handle addressing the connection object is returned to the caller to use in subsequent accesses of the engine 560, 572.

FIG. 11 illustrates logic implemented in the methods to access information on an engine in the service classes (client side) 506, 510 and (server side) 508, 512. Control begins at block 700 upon receiving a call to a method to obtain information for a named service, including a connection handle. For instance, the method may request the name of the service, type, category or resources at the engine 560, 582, e.g., work lists, workflow templates, workflows, etc. If (at block 702) the method is invoked on the client 550a, b, c, 570a, b, c, then the method is transmitted (at block 702) to the server 556, 576. If (at block 706) the method is requesting information maintained in the service object 558, 578, e.g., the category, type, connection, etc., then the information is accessed (at block 708) from the service object 558, 578 and returned to the caller. Otherwise, if the requested information is not maintained in the service object 558, 578, then the interface 564, 580 is called (at block 710) to transform the method into the native engine 560, 582 code. The engine 560, 582 uses the handle (at block 712) to access the connection object from the named service 558, 578 to authenticate the user requesting the information. If (at block 714) the information provided in the connection object addressed by the connection handle did not provide an active and authenticated connection, then a failure message is returned (at block 716). Otherwise, if the connection is authenticated, then the engine 560, 582 executes (at block 718) the method in the transformed native code, accesses the requested information, e.g., name of workflows, work lists, workflow templates, etc., and returns the requested information to the calling method.

With the described implementations, the service objects 558, 578 maintain information on one engine 560, 582 for different connections. Application 562 and 584 and users would utilize methods from the service classes 506, 508, 510, and 512 to access information on engine 560, 582 resources from the service objects 558, 578 or the engines 560, 582 using the connection object 608 information in the service objects 558, 578. The methods to access information from the service object may have originated from methods in the client side 506, 510 or server side 508, 512 of the class implementations. Further, the service objects 558 and 578 provide authentication services and information that the users and applications 562 and 584 may access using one connection handle. Once the applications 562, 584 or users obtain information on resources available for an engine 560, 582, the user or application may then access the services directly using methods and objects provided by the vendor for the service to access the particular service, such as the object oriented workflow class architecture described with respect to FIGS. 3, 4, and 5.

In the described implementations, the workflow 562 and other service 584 applications would include the methods and objects of the vendor implementations of the WorkFlowServices classes 506, 508, 510, 512 to access the engine 560, 582 resources and information thereon. The applications 562 and 584 may include methods and objects from the service implementations from multiple vendors, thereby allowing the applications to access resources from the services provided by different vendors. For instance, an application may include methods and objects to perform a search across data stores implementing data repositories from different vendors, wherein each vendor provides a service class implementation to enable access to the data repository. This allows for searches, data mining operations, and workflows to access data across multiple, heterogeneous content servers. In this way, developers may create applications 562 and 584 that are capable of accessing the services provided by different vendors. Moreover, one application may include methods to access different types of resources, such as methods to access workflow resources from one vendor and methods to access the resources of another service. Still further, one application may include methods and objects from different vendors to access the resources of one type of service as provided by different vendors.

The abstract classes 500, 502, and 504 provide base level methods and objects that must be included in all vendor implementations of the service class to provide a standard methodology as to how resources are accessed and how information on the service is provided in the service objects 558, 578. As discussed above, the abstract classes provide methods and objects concerning how to connect to an engine 560, 582, such as the connect( ) and disconnect( ) methods, and how to obtain information on available engine 560, 582 resources, such as the serviceType( ), serviceName( ), servicecategory( ) methods, which apply to all types of services. The abstract workFlowService class 502 includes methods and objects to obtain information on the resources of the workflow services, such as the getDataStore( ), listWorkLists( ), listWorkFlows( ), and listWorkFlowTemplates( ). By requiring all participating vendors to implement the same abstract service classes, the code for different vendors utilize the same methods and objects to provide access to the resources and information.Additional Implementation Details The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The workflow client and server may be implemented within any vendor workflow program known in the art.

In the described implementations, the actions were implemented as Java methods. Alternatively, the actions may be implemented in any programming language known in the art.

In the described implementations, particular icons were used to represent different information in the workflow, such as work nodes, exit nodes, etc. However, any icon design may be used to represent the workflow components. Further, additional graphical representations may be provided for different types of work nodes, e.g., collection work nodes, assign value node, decision point node, etc.

In the described implementations, the class architecture is implemented as an object oriented class architecture. Alternatively, non-object oriented programming techniques may be used to implement the described class architecture.

The services 552*a, b, c,* and 572*a, b, c,* may each execute in a separate computer system comprised of one or more computer devices. Additionally, multiple services 552*a, b, c, *572*a, b, c* may execute in a same computer system.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computerized method for enabling access to a plurality of service engines, wherein each service engine enables access to service resources, comprising:
providing a plurality of service class implementations for service engines from different vendors, wherein each service class implementation provides an implementation of methods and objects from a same abstract service class, wherein the service class implementations for the service engines include both a client side service class and server side service class, wherein the client side service class includes methods and objects used to access information on resources available at one service engine, wherein the server side service class includes methods and objects to access information on resources available at the service engine, and wherein the client side service class methods are invoked on a client system and the server side service class methods are invoked on a server including the service engine;
receiving, at the client system, a construct method to construct a client side service object to access the service engine;
constructing the client side service object in response to the construct method;
communicating the construct method to the server to cause the server to construct a server side service object;
instantiating the server side service object for the service engine in response to the construct method, wherein the service object includes information on the service engine; and
issuing method calls from client applications in the client system to access information from the service engine using the constructed client-side and server side service objects.

2. The method of claim 1, wherein the method call is received from at least one application program including methods from at least one of the service class implementations to access information on at least one service from the service objects.

3. The method of claim 1, wherein the service engines comprise workflow products from different vendors, wherein the workflow products comprise computer programs enabling implementation of a computer implemented workflow defining a series of processes to be performed by users at computers with respect to a computer implemented work item.

4. The method of claim 3, wherein the workflow service class implementations from different vendors each includes methods and objects from a same abstract workilow service class specifying methods and objects to include in all workflow service class implementations.

5. The method of claim 4, wherein the abstract workflow service class specifies a method to determine a data store used by resources in the service, wherein the workflow service class implementations for the workflow services implement a method to determine from the service object for the service the data store used by the service.

6. The method of claim 4, wherein the abstract workflow service class specifies methods to access information on workilows, workflow templates, and worklists.

7. The method of claim 4, wherein the abstract workflow class specifies a method for a user to connect to the workilow service by passing user information that is used to authenticate the user to access the workflow service, and wherein the workilow service class implementations include methods to enable a connection between a user and one workflow service.

8. The method of claim 7, farther comprising:
receiving a method call for the user to connect specifying a user name, authentication information, and one service;
instantiating a connection object if authentication passed including information on the specified user name, authentication information, and the service engine that can be accessed with the authentication; and
returning a handle to the connection object for use in obtaining authentication information to access the service engine specified in the connection object.

9. The method of claim 8, wherein the connection object is stored in one service object.

10. The method of claim 1, further comprising:
receiving one handle to one connection object; and
returning authentication information from the connection object for use in accessing the service resources.

11. The method of claim 1, wherein a call to one method in the client side service class implementation on the client transfers the called method to the server, wherein the called method is executed on the server.

12. The method of claim 1, wherein information on the service engine is maintained in the service object and wherein using the service object to access the requested information further comprises:
if the method call requests information in the service object, returning the requested information from the service object.

13. The method of claim 12, further comprising:
if the method call requests information not included in the service object, executing the method to access the requested information from the service engine.

14. The method of claim 12, further comprising:
accessing authentication information from the service object;
providing the accessed authentication information to the service engine;
using, with the service engine, the accessed authentication information to authenticate access, wherein the service engine executes the method to access the requested information if access is authenticated.

15. The method of claim 13, wherein accessing the requested information from the service engine further comprises:
translating the method to native code capable of being executed by the service engine.

16. A system for enabling access to a plurality of service engines, wherein each service engine enables access to service resources, comprising:
(a) a client system, including:
(i) a client computer readable medium, wherein the client computer readable medium stores a client side service class, and wherein the client side service class includes methods and objects used to access information on resources available at one service engine;
(ii) means for receiving a construct method to construct a client side service object to access the service engine;

(iii) means for constructing the client side service object in response to the construct method;

(iv) means for communicating the construct method to the server to cause the server to construct a server side service object; and (v) means for issuing method calls from client applications in the client system to access information from the service engine using the constructed client-side and server side service objects; and (b) a server system, including:

(i) a server computer readable medium, wherein the server computer readable medium stores server side service class implementations for service engines from different vendors, and wherein the server side service class includes methods and objects to access information on resources available at the service engines from a same abstract service class; and (ii) means for instantiating a service object in the server computer readable medium for the service engine in response to the construct method wherein the service object includes information on the service engine.

17. The system of claim 16, wherein the method call is received from at least one application program including methods from at least one of the service class implementations to access information on at least one service from the service objects.

18. The system of claim 16, wherein the service engines comprise workflow products from different vendors, and wherein the at least one computer readable medium includes workflow service class implementations from different vendors, wherein the workflow products comprise computer programs enabling implementation of a computer implemented workflow defining a series of processes to be performed by users at computers with respect to a computer implemented work item.

19. The system of claim 18 wherein the workilow service class implementations from different vendors each includes methods and objects from a same abstract workilow service class specifying methods and objects to include in all workilow service class implementations.

20. The system of claim 19, wherein the abstract workflow service class specifies a method to determine a data store used by resources in the service, wherein the workflow service class implementations for the workflow services implement a method to determine from the service object for the service the data store used by the service.

21. The system of claim 19, wherein the abstract workflow service class specifies methods to access information on workilows, workflow templates, and worklists.

22. The system of claim 19, wherein the abstract workflow class specifies a method for a user to connect to the workilow service by passing user information that is used to authenticate the user to access the workflow service, and wherein the workilow service class implementations include methods to enable a connection between a user and one workflow service.

23. The system of claim 22, further comprising:

means for receiving a method call for the user to connect specifying a user name, authentication information, and one service;

means for instantiating a connection object in one computer readable medium if authentication passed, wherein the connection object includes information on the specified user name, authentication information, and the service engine that can be accessed with the authentication; and means for returning a handle to the connection object for use in obtaining authentication information to access the service engine specified in the connection object.

24. The system of claim 23, wherein the connection object is stored in one service object in the computer readable medium.

25. The system of claim 16, further comprising:

means for receiving one handle to one connection object; and means for returning authentication information from the connection object for use in accessing the service resources.

26. The system of claim 16, further comprising:

means for transferring a call to one method in the client side service class implementation on the client to the server, wherein the called method is executed on the server.

27. The system of claim 16, wherein information on the service engine is maintained in the service object and wherein using the service object to access the requested information further comprises:

means for returning the requested information from the service object if the method call requests information in the service object.

28. The system of claim 27, further comprising:

means for executing the method to access the requested information from the service engine if the method call requests information not included in the service object.

29. The system of claim 27, further comprising:

means for accessing authentication information from the service object; and means for providing the accessed authentication information to the service engine, wherein the service engine uses the accessed authentication information to authenticate access, wherein the service engine executes the method to access the requested information if access is authenticated.

30. The system of claim 27, wherein the means for executing the method to access the requested information from the service engine further performs:

translating the method to native code capable of being executed by the service engine.

31. An article of manufacture comprising a computer readable medium storing code executed by a computer for enabling access to a plurality of service engines, wherein each service engine enables access to service resources, wherein the code is capable of causing operations to be performed, the operations comprising:

providing a plurality of service class implementations for service engines from different vendors, wherein each service class implementation provides an implementation of methods and objects from a same abstract service class, wherein the service class implementations for the service engines include both a client side service class and server side service class, wherein the client side service class includes methods and objects used to access information on resources available at the service engine, wherein the server side service class includes methods and objects to access information on resources available at one service engine, and wherein the client side service class methods are invoked on a client system and the server side service class methods are invoked on a server including the service engine;

receiving, at the client system, a construct method to construct a client side service object to access the service engine;

constructing the client side service object in response to the construct method;

communicating the construct method to the server to cause the server to construct a server side service object;

instantiating the server side service object for one service engine in response to the construct, wherein the service object includes information on the service engine; and issuing method calls from client applications in the client system to access information from the service engine using the constructed client-side and server side service objects.

32. The article of manufacture of claim 31, wherein the method call is received from at least one application program including methods from at least one of the service class implementations to access information on at least one service from the service objects.

33. The article of manufacture of claim 31, wherein the service engines comprise workilow products from different vendors, wherein the workflow products comprise computer programs enabling implementation of a computer implemented workilow defining a series of processes to be performed by users at computers with respect to a computer implemented work item.

34. The article of manufacture of claim 33, wherein the workilow service class implementations from different vendors each includes methods and objects from a same abstract workilow service class specifying methods and objects to include in all workflow service class implementations.

35. The article of manufacture of claim 34, wherein the abstract workflow service class specifies a method to determine a data store used by resources in the service, wherein the workilow service class implementations for the workilow services implement a method to determine from the service object for the service the data store used by the service.

36. The article of manufacture of claim 34, wherein the abstract workflow service class specifies methods to access information on workflows, workflow templates, and worklists.

37. The article of manufacture of claim 34, wherein the abstract workflow class specifies a method for a user to connect to the workilow service by passing user information that is used to authenticate the user to access the workilow service, and wherein the workilow service class implementations include methods to enable a connection between a user and one workflow service.

38. The article of manufacture of claim 37, further comprising:

receiving a method call for the user to connect specifying a user name, authentication information, and one service;

instantiating a connection object if authentication passed including information on the specified user name, authentication information, and the service engine that can be accessed with the authentication; and returning a handle to the connection object for use in obtaining authentication information to access the service engine specified in the connection object.

39. The article of manufacture of claim 38, wherein the connection object is stored in one service object.

40. The article of manufacture of claim 31, further comprising:

receiving one handle to one connection object; and returning authentication information from the connection object for use in accessing the service resources.

41. The article of manufacture of claim 31, wherein a call to one method in the client side service class implementation on the client transfers the called method to the server, wherein the called method is executed on the server.

42. The article of manufacture of claim 31, wherein information on the service engine is maintained in the service object and wherein using the service object to access the requested information further comprises:

if the method call requests information in the service object, returning the requested information from the service object.

43. The article of manufacture of claim 42, further comprising:

if the method call requests information not included in the service object, executing the method to access the requested information from the service engine.

44. The article of manufacture of claim 42, further comprising:

accessing authentication information from the service object;

providing the accessed authentication information to the service engine; and using, with the service engine, the accessed authentication information to authenticate access, wherein the service engine executes the method to access the requested information if access is authenticated.

45. The article of manufacture of claim 43, wherein accessing the requested information from the service engine further comprises:

translating the method to native code capable of being executed by the service engine.

* * * * *